US012671301B2

(12) United States Patent
Swerts et al.

(10) Patent No.: US 12,671,301 B2
(45) Date of Patent: Jun. 30, 2026

(54) COMPRESSOR ASSEMBLY COMPRISING A MOTOR DRIVING ONE OR MORE COMPRESSOR ROTORS

(71) Applicant: ATLAS COPCO AIRPOWER, NAAMLOZE VENNOOTSCHAP, Wilrijk (BE)

(72) Inventors: Thomas Swerts, Wilrijk (BE); Flip Mathys, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 0 days.

(21) Appl. No.: 18/847,503

(22) PCT Filed: Mar. 3, 2023

(86) PCT No.: PCT/IB2023/051984
§ 371 (c)(1),
(2) Date: Sep. 16, 2024

(87) PCT Pub. No.: WO2023/187500
PCT Pub. Date: Oct. 5, 2023

(65) Prior Publication Data
US 2025/0192646 A1    Jun. 12, 2025

(30) Foreign Application Priority Data

Mar. 30, 2022    (BE) .................................. 2022/5228

(51) Int. Cl.
H02K 9/19         (2006.01)
H02K 5/20         (2006.01)
(Continued)

(52) U.S. Cl.
CPC ............. H02K 9/193 (2013.01); H02K 5/203 (2021.01); H02K 7/14 (2013.01); *H02K 2209/00* (2013.01)

(58) Field of Classification Search
CPC .......... H02K 5/203; H02K 7/14; H02K 9/193; H02K 2209/00; F04C 2240/30;
(Continued)

(56) References Cited

U.S. PATENT DOCUMENTS 4,291,547 A      9/1981  Leo
10,704,567 B2 *  7/2020  Meeusen .................. H02K 9/19
(Continued)

FOREIGN PATENT DOCUMENTS

CN      108700071 A     10/2018
CN      108730191 A     11/2018
(Continued)

OTHER PUBLICATIONS

Belgian Search Report from corresponding Belgian Patent Application No. BE202205228, Dec. 29, 2022.
(Continued)

*Primary Examiner* — Dapinder Singh
(74) *Attorney, Agent, or Firm* — Workman Nydegger

(57)         ABSTRACT

A compressor assembly includes a compressor assembly housing, a motor that drives one or more compressor rotors, an oil reservoir, an oil cooler, and an oil filter. The motor has a motor jacket with first group channels for cooling the motor, and the compressor assembly housing having one or more pass-through channels forms at least a part of an oil line that interconnects components of the compressor assembly.

18 Claims, 17 Drawing Sheets

(51) Int. Cl.
    *H02K 7/14*         (2006.01)
    *H02K 9/193*       (2006.01)

(58) Field of Classification Search
    CPC .. F04C 2240/40; F04C 29/0007; F04C 29/02;
          F04C 29/025; F04C 29/04; F04C 29/045;
          F04C 29/00; F04C 29/021; F04C 18/16;
          F04C 18/18; F04C 23/02
    See application file for complete search history.

(56) References Cited

U.S. PATENT DOCUMENTS

| | | | |
|---|---|---|---|
| 11,053,942 B2 | 7/2021 | Hamada et al. | |
| 11,085,448 B2 | 8/2021 | De Bontridder et al. | |
| 2005/0235686 A1* | 10/2005 | Bin-Nun | F25B 1/02 |
| | | | 62/505 |
| 2007/0241627 A1 | 10/2007 | Kharsa | |

| | | | |
|---|---|---|---|
| 2016/0281740 A1 | 9/2016 | Mitsuda et al. | |
| 2017/0016478 A1* | 1/2017 | Tsao | F16C 32/0644 |
| 2020/0102964 A1 | 4/2020 | Nakane et al. | |

FOREIGN PATENT DOCUMENTS

| | | | |
|---|---|---|---|
| EP | 3263903 A1 | 1/2018 | |
| JP | 2016186238 A | 10/2016 | |
| JP | 2016200058 A | 12/2016 | |
| WO | 2018079196 A1 | 5/2018 | |

OTHER PUBLICATIONS

International Search Report from corresponding PCT Application No. PCT/IB2023/051984, May 9, 2023.
Japanese Office Action from Corresponding Japanese Patent Application No. JP2024552455, Jul. 29, 2025.
Chinese Office Action from Corresponding Chinese Patent Application No. CN202310318987.0, Mar. 12, 2026.

* cited by examiner

COMPRESSOR ASSEMBLY COMPRISING A MOTOR DRIVING ONE OR MORE COMPRESSOR ROTORS

TECHNICAL FIELD

The present invention relates to a compressor assembly comprising a compressor assembly housing and a motor which drives one or more compressor rotors of a compressor element.

The compressor assembly also comprises an oil circulation system for cooling and lubricating components of the compressor assembly. This oil circulation system comprises an oil reservoir and oil is circulated through oil lines of the oil circulation system from the oil reservoir to the concerned components to be lubricated or cooled and back to the oil reservoir.

Furthermore, the oil circulation system also comprises an oil cooler for cooling oil circulating through the oil circulation system and an oil filter for filtering oil flowing through one or more lines of the oil circulation system.

The oil lines are intended for connecting components of the compressor assembly with one another. These compressor assembly components can be core components such as the motor or a compressor rotor, motor shaft bearings, gearing, etc . . . , but these compressor assembly components can also be components of the oil circulation system, such as the oil reservoir, the oil filter, the oil cooler. These components of the oil circulation system are in other words also considered as being parts of the compressor assembly.

The invention is specifically interesting for compressor assemblies wherein the compressor element is an oil-free or oil-less compressor element, which means that no oil for lubrication is injected between the compressor rotors itself of the compressor element, while other components such as bearings and gearing are usually lubricated by the oil of the oil circulation system. The reason for using an oil-free or oil-less compressor element is that the fluid to be pressurized or compressed in the compressor element is kept free from oil or uncontaminated by oil. This is for example very important in food processing applications and so on.

Nevertheless, the invention is not restricted to compressor assemblies comprising an oil-free or oil-less compressor element and compressor assemblies comprising for example an oil-injected compressor element are not excluded from the invention.

Different techniques can be used to compress or pressurize a fluid in a compressor element. The present invention is related to a compressor assembly wherein the compressor element is a rotary compressor element having compressor rotors driven by the motor for a rotational movement.

The motor is typically an electric motor, but it can be a combustion engine, or it can in principle be any other type of rotational driver or activator or combination of devices for generating a rotational movement.

The motor of a compressor assembly according to the invention has a motor housing comprising a central motor housing body executed as a jacket in which channels are provided which are connected to oil lines of the oil circulation system for circulating oil through the motor jacket.

Typically, the motor housing is interconnected with a compressor housing of the compressor element for forming a compressor assembly housing of the compressor assembly.

In a possible embodiment the motor housing consists entirely and solely of the motor jacket, which is directly connected to an interconnecting flange for connecting the motor housing to the compressor housing. In other embodiments, typically in cases where the motor is pre-assembled before connecting the motor to the compressor element of the compressor assembly, the motor housing can be executed with a flange, or a cover provided at one side or at each of both opposite sides of the central motor housing body which is forming the motor jacket.

The motor has a motor shaft which essentially extends through the motor housing and possibly through a part of the compressor housing and this motor shaft has a drive side where the motor shaft is connected or coupled to the concerned compressor rotor shaft or other parts of the compressor element.

This can be realized in a direct manner by directly interconnecting or coupling a shaft of a concerned compressor rotor to the motor shaft by means of a direct coupling. This direct coupling can be housed in a part of the motor housing or of the compressor housing, but it can also be housed in an intermediate housing part or an intermediate compartment of the compressor assembly housing provided between the motor housing and the compressor housing.

In another embodiment, the coupling or interconnection of the motor shaft and a concerned compressor rotor shaft is realized in an indirect manner by means of an intermediate gearwheel transmission or gearbox. Such a gearwheel transmission or gearbox is typically housed in an intermediate gearwheel transmission housing, which is positioned in between the compressor housing and the motor housing.

The compressor element of the compressor assembly is intended for compressing or pressurizing a fluid, typically a gaseous fluid such as air or another gas, such as oxygen, carbon dioxide, nitrogen, argon, helium or hydrogen. It is however not excluded from the invention that the compressor element is used for compressing or pressurizing a denser fluid, such as water vapor or the like.

BACKGROUND

Compressor assemblies comprising an oil-free or oil-less or oil-injected compressor element which is directly or indirectly by means of a gear transmission coupled to a motor are known according to the state of the art.

Regardless of whether the compressor element is an oil-free or oil-less or an oil-injected compressor element, a lot of elements or components of such a compressor assembly need to be lubricated or cooled by oil. For that reason, the compressor assembly comprises an oil circulation system.

Elements or components of the compressor assembly that need lubrication or cooling by oil typically include: gearwheels, such as timing gears or gearwheels of a gearwheel transmission between the compressor element and the motor of the compressor assembly; a compressor outlet; bearings of a compressor rotor shaft; a motor shaft bearing; and so on.

Oil driving means for circulating the oil through the oil circulation system can consist of the compressor rotors of the compressor assembly itself or of other oil driving means or in combination.

For cooling the motor of the compressor assembly, the motor housing is executed as a jacket provided with channels in which oil of the oil circulation system can flow.

An oil reservoir or oil sump, an oil pump, an oil cooler and an oil filter are usually also included in the oil circulation system.

Many oil injection lines and oil drain lines are needed for circulating oil from the oil reservoir to the motor housing jacket and to the components or elements of the compressor assembly to be lubricated or cooled and back to the oil reservoir. These lines also interconnect the oil driving means, the oil cooler and oil filter with each other or with elements and components of the compressor assembly.

It is easily understood that the amount of oil lines and components involved makes a good, compact, and efficient design rather complicated.

What's more, at places where oil lines must be connected to one of the afore-mentioned elements or components of the compressor assembly or the oil circulation system there is a need for a proper sealing.

The more components and lines are involved, the greater is the risk of oil leaking at one point or another. This is a great danger for the proper functioning of the compressor assembly and for a proper lubrication and/or cooling of its vital elements. Such situations should therefore also be avoided as much as possible.

Therefore, the big challenge of designing a proper compressor assembly of the type of concern is to arrange all the required oil circuit components (e.g., oil pump, piping, cooling channels, injection channels, oil filter, breather, other elements) in a compact way in order to reduce the required number of components and space, footprint of the compressor assembly.

Another challenge is to reduce the number of connections between the oil lines and components of the compressor assembly as much as possible and to reduce the risks for oil leaks.

Furthermore, in practice compressor assemblies are needed in different sizes corresponding to varying required compression powers, which depend on the required outlet pressure of the pressurized fluid and/or the flow rate of pressurized fluid at the outlet of the compressor element of the compressor assembly. This means that also the compressor assembly housings must be fabricated in different sizes.

Such a housing of a motor or compressor element of a compressor assembly are often fabricated in a casting process. For casting a casting mold is required and each different design is made by another casting mold. The production of casting molds is labor intensive and rather expensive, so that it is only cost-effective to produce a series of compressor assemblies of a certain type or size, if the total amount to be produced is sufficiently high. So, according to the present state of the art there is not a lot of flexibility to change the design or size of a compressor assembly.

Furthermore, in applications wherein the concerned compressor assembly is comprising a compressor element which is an oil-free or oil-less compressor element, particular problems must be solved.

Indeed, in oil-injected compressor elements the oil is circulated in the oil circulation system by a pumping force generated by the compressor rotors of the compressor element itself. This is possible since oil is injected between those compressor rotors.

In an oil-free or oil-less compressor element however this is not possible since contamination of the pressurized fluid by lubrication oil is completely unacceptable in such an oil-free or oil-less compressor.

Consequently, the role of generating a pumping force for pumping the oil in the oil circulation system cannot be taken by the compressor rotors, but an additional oil driving means or an oil driving means with an increased capacity for generating a pumping force, such as an oil pump, which is placed outside the compression chamber should be provided for that purpose.

This means that in an application wherein the compressor assembly comprises an oil-free or oil-less compressor element the need for integration of an additional oil pump or other oil driving means and/or additional oil lines in the compressor assembly design is generally higher than in oil-injected compressor applications. The problem of coming to a compact and efficient design and nicely integrated design of such a compressor assembly with an oil-free or oil-less compressor element is for the same reasons relatively more complex.

Also, in an oil-free or oil-less compressor element there is a need for an additional oil-pump or oil driving means or for increasing the capacity of such an oil-pump or oil driving means for pumping oil through the oil circulation system of a compressor assembly, which implies extra costs for the added components and/or due to increased energy consumption.

Another important aspect related to the present invention is that in an oil-injected compressor element all the lubrication and cooling oil is usually circulated under the pressure delivered by the compressor rotors. The requirements on the quality of this lubrication and cooling oil is high since the complete flow of oil passes through the compressor room between the compressor rotors. For a reliable functioning of the compressor element, it is important that this lubrication and cooling oil is free from contamination, which is obtained by passing the oil through an oil-filter. The filter requirements in an oil-injected compressor element are therefore very high.

On the other hand, in an oil-free or oil-less compressor element no oil is injected between the compressor rotors. The requirements for filtering the lubrication and/or cooling oil are therefore different from what is the case in an oil-injected compressor element.

Clearly, when designing a compressor assembly, a lot of different aspects must be taken into account, such as the number of components and devices and oil line connections between these components and devices incorporated in the compressor assembly, the cost and complexity of the manufacturing, the quality and purity of the lubrication and/or cooling oil in certain parts of the assembly, the size and power of the assembly, and so on. So, designing such a compressor assembly in a compact, cost-effective, and reliable manner involves a lot of engineering and is far from obvious.

SUMMARY OF THE INVENTION

It is an aim of the invention to overcome one or more of the afore-mentioned problems and/or possibly still other problems.

It is particularly a goal of the invention to provide a more integrated design of a compressor assembly, wherein the number of oil line connections and the need for sealing those connections is reduced substantially, so that there is less risk for failure or reduced performance of the compressor assembly caused by leaking lubrication or cooling oil or by contamination of that oil.

Another objective of the invention is to reduce the vulnerability of connections between oil lines and components of the compressor assembly.

Another aim of the present invention is to provide a solution which is cost effective and allowing a relatively easy adaptation of a design of a compressor assembly, especially as far as its length is concerned, without the need for costly modifications to its manufacturing process.

Still another objective of the present invention is to provide a compressor assembly with an optimized or improved oil filtering system, wherein lubrication and/or cooling oil is filtered in a way which is adapted to the needs of involved components of the compressor assembly.

A further aim of the invention is to realize one or more of the afore-mentioned objectives in a compressor assembly which comprises a compressor element which is an oil-free or oil-less rotor compressor element.

Finally, it is also an aim of the invention to develop a compact compressor assembly wherein a motor shaft is coupled to a compressor rotor shaft directly or indirectly through a gear transmission of preferably limited size and wherein motor, compressor element and possible gear transmission are integrated in a compressor assembly housing.

To this end, the present invention relates to a compressor assembly, comprising a compressor assembly housing, a motor which drives one or more compressor rotors of a compressor element, comprising an oil circulation system for cooling and lubricating components of the compressor assembly, wherein the oil circulation system comprises an oil reservoir, an oil cooler and an oil filter, respectively for cooling and for filtering oil flowing through one or more oil lines of the oil circulation system which interconnect components of the compressor assembly, wherein the motor has a motor housing comprising a central motor housing body executed as a motor jacket in which motor jacket channels are provided for circulating oil through the motor jacket, wherein the motor jacket comprises at least a first group of motor jacket channels composed of one or more such channels which is intended for cooling the motor and wherein the compressor assembly housing comprises one or more pass-through channels for guiding oil through the compressor assembly housing and wherein such a pass-through channel forms at least a part of an afore-mentioned oil line which interconnects components of the compressor assembly.

A first important aspect of such a compressor assembly in accordance with the invention is that the motor jacket of the compressor assembly comprises a first group of motor jacket channels composed of one or more such channels which is intended for cooling the motor, so that the motor jacket is forming at least partly a kind of heat exchanger for cooling the motor mounted in the motor housing. With this first group of motor jacket channels the cooling of the motor is to a great extent integrated in the compressor assembly housing.

Another important aspect of a compressor assembly in accordance with the invention is that the compressor assembly housing comprises one or more pass-through channels for guiding oil through the compressor assembly housing. In that way one or more oil lines which interconnect(s) components of the compressor assembly are also at least partly integrated in the compressor assembly housing.

A great advantage of such a design of a compressor assembly in accordance with the invention is that it comprises less connections or less vulnerable connections between oil lines and components of the compressor assembly, so that the risk for oil leaks is substantially reduced.

Another advantage of such a compressor assembly in accordance with the invention is that it is substantially more compact than the existing compressor assemblies of the same type.

Still another advantage of compressor assembly in line with the invention is that it can be assembled in a relatively easier way, since it requires less manipulations of the concerned mechanic or engineer for connecting and sealing oil lines to components of the compressor assembly.

In a preferred embodiment of a compressor assembly in accordance with the invention the compressor assembly housing houses integrated compressor assembly components, which comprise at least the motor, the compressor element and interconnection means for interconnecting the motor and the compressor element and possibly one or more other integrated compressor assembly components, such as the oil reservoir, the oil-filter, the oil-cooler, an oil-pump and possibly still other integrated compressor assembly components and wherein an integrated compressor assembly component or an integrated element of such an integrated compressor assembly component that needs to be lubricated or cooled, is connected to another such an integrated compressor assembly component or another such integrated element by means of an aforementioned oil line which is entirely formed by a pass-through channel which is provided in the compressor assembly housing for forming an entirely integrated oil line.

A great advantage of such an embodiment of a compressor assembly in accordance with the invention is that one or more oil lines which interconnect components of the compressor assembly, which are integrated in the compressor assembly housing, is or are entirely integrated in the compressor assembly housing. This means that such an oil line connection between two integrated compressor assembly components is entirely formed by a pass-through channel in the compressor assembly housing.

In that way the number of oil lines which are mounted externally on the compressor assembly housing is substantially reduced. As a result, the risk for oil leaks and rupture of oil lines is also significantly reduced. The design is therefore also more robust and reliable during operation.

In a still more preferred embodiment of a compressor assembly in accordance with the invention each interconnection oil line between an integrated compressor assembly component and/or an integrated element thereof is formed by an afore-mentioned entirely integrated oil line.

Such an embodiment of a compressor assembly in accordance with the invention is very advantageous since all the oil lines between integrated compressor assembly components or elements thereof are realized by an entirely integrated oil line, formed by a pass-through channel which extends entirely through the compressor assembly housing between the concerned integrated components or elements.

This means that a rather elaborated integration of oil lines in the compressor assembly has taken place, which results in a still increased reliability during operation, compactness of the design, increased efficiency during assembly and reduced cost of production.

A compressor assembly according to the invention preferably also comprises one or more oil cooling line sections which extend(s) from the oil cooler to the oil reservoir in such a way that the first group of motor jacket channels are each included in one of the one or more oil cooling line sections for cooling the motor.

It is obvious that by including the motor jacket channels of the first group in an oil cooling line section which extends from the oil cooler to the oil reservoir, the needed cooled oil is provided to the motor for cooling the motor. The oil in which heat from the motor is accumulated during passage through the motor jacket channels is returned to the reservoir from where it is forced again through the oil circulation system for being cooled in the oil-cooler in a later stage.

In still another preferred embodiment of a compressor assembly according to the invention the oil circulation system of the compressor assembly comprises at least a first circulation loop and a second circulation loop wherein oil is circulating between the oil reservoir and the oil cooler and back, wherein the first circulation loop is an unfiltered circulation loop wherein no oil filter is included and the second circulation loop is a filtered circulation loop in which the oil filter is provided for filtering the oil and wherein the motor jacket channels of the first group are included in the first unfiltered circulation loop, which motor jacket channels are forming cooling channels for cooling of the motor housing jacket.

In such an embodiment of a compressor assembly in accordance with the invention not all the oil circulating through the oil circulation system must be filtered constantly. Instead, the total flow of oil in the oil circulation system is divided into two streams of oil which are flowing through two different circulation loops, i.e., a filtered circulation loop and an unfiltered circulation loop.

Importantly, the oil flow through the motor jacket for cooling it is part of the unfiltered circulation loop and this oil flow is generally rather large compared to the flow of filtered oil for lubricating bearings and gearing of the compressor assembly.

This is a very advantageous configuration. Indeed, the lifetime of a filter is defined by a) contamination of the oil and b) the flow rate passing through the filter. In an embodiment of a compressor assembly as here discussed, most of the oil flow rate is used for cooling without being filtered. Therefore, the lifetime of the filter of the oil circulation system is increased to a great extent by only filtering the more limited oil flow of oil used for lubrication.

This needs some explanation. Filtering all the oil of the oil circulation system and thus using also filtered oil as cooling medium has in a way also a certain advantage, since it might allow for a slightly less complex mechanical design. Indeed, the motor bearings can in that case for example be lubricated by means of filtered oil provided through lubrication points which can be formed by simple bleed-off points drawing off filtered oil from the channels in the motor jacket. Such a simple design for bringing filtered oil to the motor bearings is not possible when the channels in the motor jacket are transporting cooling oil which is not filtered.

A disadvantage however of filtering all the oil of the oil circulation system is that the system needs more frequently to be serviced. Or, as an alternative an oversized oil filter should be used. Also, the pressure drop over an oil filter increases quadratically with the flow rate going through it. So, for reducing this pressure drop the size of the filter must be large enough in order to keep the flow rate through the filter sufficiently low. This is also problematic in the case the filtered oil is not only serving for lubrication purposes, but also for cooling purposes.

The characteristic of the invention to split the total oil flow in a filtered circulation loop for lubrication and an unfiltered circulation loop for cooling is a smart way of designing a compressor assembly. The disadvantage of rendering the design slightly more complicated for as far as supplying filtered lubrication oil to some parts of the assembly is concerned, is largely compensated by the advantages that smaller oil filters can be used and that oil filters have a longer lifetime and need to be serviced less frequently. By integrating filtered oil lines and unfiltered oil lines in the motor jacket in an intelligent manner, such a design in accordance with the invention is also very compact, reliable, and robust.

In another preferred embodiment if a compressor assembly in accordance with the invention the motor jacket comprises a second group of motor jacket channels composed of one or more such channels which are not motor jacket channels of the first group and which form each an afore-mentioned pass-through channel or a part of such a pass-through channel for guiding oil through the motor jacket.

A great advantage of such an embodiment of a compressor assembly of the invention is that one or more oil lines which are not intended for cooling the motor are also partly integrated in the motor jacket. This motor jacket comprises in this case a first group of motor jacket channels which are intended for cooling the motor as well as a second group of motor jacket channels which are not intended for cooling and which guide oil through the motor jacket for example towards an oil cooler or towards the oil reservoir or coming from an oil pump or from the oil reservoir and so on. This second group of motor jacket channels are very efficient means for realizing a compressor assembly wherein a lot of components and elements and the interconnecting oil lines between those components and elements are integrated in the compressor assembly housing. In that way a very compact and reliable design can be realized which is much more easily assembled than the known compressor assemblies.

The choice of at least partly integrating oil lines between components and elements of the compressor assembly in the motor jacket which are not intended for the motor cooling together with other motor jacket channels of the first group which are intended for the motor cooling is not obvious. A careful equilibrium needs to be reached between, on the one hand, a reduced motor cooling, and, on the other hand, an increased integration of components in the compressor assembly housing.

In a possible embodiment of a compressor assembly in accordance with the invention one or more of the following oil lines of the compressor assembly are at least partly integrated in the motor jacket by being partly formed by one or more motor jacket channels of the second group:

an oil line for supplying oil from the oil reservoir to the oil filter and/or to the oil cooler;

an oil line which is connected to an outlet of the oil filter for supplying filtered oil to a component of the compressor assembly;

an oil line which is connected to an outlet of the oil cooler for supplying cooled oil to a component of the compressor assembly;

an oil injection line for supplying oil to a component of the compressor assembly for lubrication purposes; and/or, an oil drain line for draining oil coming from a component of the compressor assembly towards the oil reservoir.

Dependent on the application and the needs more or less of these oil lines can be integrated in the compressor assembly housing and in the motor jacket, either partly or entirely.

In a preferred embodiment of a compressor assembly in accordance with the invention the oil circulation system comprises an oil-pump for providing driving force for circulating oil through oil lines of the oil circulation system from the oil reservoir to the concerned components to be cooled and/or lubricated and back to the oil reservoir.

In that case preferably one or more of the following oil lines of the compressor assembly are at least partly integrated in the motor jacket by being partly formed by one or more motor jacket channels of the motor jacket of the second group or are at least partly integrated in the compressor assembly housing:

an oil pump suction line for connecting the oil reservoir with an inlet of the oil pump of the compressor assembly; and/or, an oil pump pressure line for connecting an outlet of the oil pump with the oil cooler and/or the oil filter.

A first important aspect of such a compressor assembly in accordance with the invention is that it is provided with an oil-pump for circulating oil through oil lines of the oil circulation system of the assembly.

A great advantage of this aspect is that the oil-pump provides at least part of the needed driving force for the circulation of oil through the oil circulation system. As a consequence, the oil is not necessarily pumped by a driving force provided by the compressor rotors of the compressor assembly and therefore the compressor assembly is suitable for oil-free as well as for oil-injected types of compressors.

Therefore, the afore-mentioned preferred characteristics of a compressor assembly in accordance with the invention are especially very advantageous for application in embodiments wherein the compressor element of the compressor assembly is an oil-free or oil-less compressor element.

Indeed, in an oil-free or oil-less compressor assembly there is always a need for an oil-pump which generates the driving force for pumping lubrication or cooling oil through the oil circulation system.

In a preferred embodiment of a compressor assembly according to the invention the oil-pump is integrated in the motor housing or is mounted on a motor housing cover or on another part of the compressor assembly housing provided at a non-drive side or at a drive side of the central motor housing body and is driven by the motor shaft of the motor.

The non-drive side is opposite to the drive side of the central motor housing body, which drive side is the side of that central motor housing body where the motor is driving the compressor rotors of the compressor element.

A great advantage of such an embodiment of a compressor assembly of the invention is that a very compact compressor assembly of restricted size can be realized in which many elements of the compressor element are integrated in an efficient and logical way.

Indeed, the oil-pump is brought very close to the motor and its motor shaft and can therefore be driven by said motor shaft together with the compressor rotors of the compressor element, so that no additional driving means are required for driving the oil pump.

Another advantage of such an embodiment of a compressor assembly in accordance with the invention wherein an oil-pump is directly driven by the same motor of the compressor assembly which is also driving the compressor element and is not driven by additional, external driving means, is that it is more efficient and more reliable to include the oil pump as mechanical part directly coupled to the main motor. In this way, lubrication of bearings is always guaranteed when the motor is running, if at least there are no mechanical failures or no obstructions in the oil circuit. An electrically driven external oil pump is less reliable, since a simple communication failure might prevent the pump from running when the machine starts up. Too long "dry running" without lubrication will cause detrimental damage to the bearings of the motor and/or compressor element or intermediate gearing.

In a preferred embodiment of a compressor assembly according to the invention, the oil-pump is furthermore at its outlet directly connected to an afore-mentioned motor jacket channel in the central motor housing body.

A great advantage of such an embodiment of a compressor assembly of the invention is that an oil pressure line of the oil pump is also integrated in the motor housing, so that no additional external oil line must be coupled to the oil pump outlet. It allows also for a very robust design, reducing substantially the risk for oil leaks at the outlet of the oil pump. Furthermore, with such a design, failure of an external oil line at the oil-pump outlet, for example caused by accidental disruption or material fatigue, cannot occur, so that the reliability of the compressor assembly is increased.

In a possible embodiment of a compressor assembly in accordance with the invention the motor housing is provided with a pass-through channel, which passes through the central motor housing body and through motor housing covers provided at opposite ends of the central motor housing body and wherein the outlet of the oil-pump is directly connected to this pass-through channel and is forming at least partly an oil-pump pressure line of the oil-pump.

Such a combination of an oil-pump which is integrated and oil-pump pressure line which is partly integrated in the motor housing ensures compactness and reliability during operation.

In still another preferred embodiment of a compressor assembly in accordance with the invention the motor housing comprises additionally at a drive side of the central motor housing body a drive side motor housing cover or cap adjacent to the compressor rotors driven by the motor and comprises at a non-drive side of the central motor housing body a non-drive side motor housing cover or cap at the opposite side of the central motor housing body, wherein the motor housing covers or caps comprise one or more interconnection channels which collaborate in the assembled status with motor jacket cooling channels of the first group for interconnecting the concerned cooling channels for forming a single or multiple composed cooling channel(s) for cooling of the motor housing jacket.

An advantage of such an embodiment of a compressor assembly in accordance with the invention is that multiple motor jacket channels can be combined into a composed cooling channel by means of interconnection channels in covers or caps of the central motor housing body, so that a composed cooling channel is formed having a length which is several times the length of a single motor jacket channel. Different configurations are easily made, by using caps or covers with interconnection channels of changing configuration. Furthermore, it allows for a reduction of connections between the oil cooler and the motor jacket channels, since not every single motor jacket channel needs a connection to the oil cooler. It suffices to connect the composed cooling channel to the oil cooler.

In a preferred embodiment of a compressor assembly in accordance with the invention the channels in the motor jacket are extending in axial directions parallel to the axial direction of a motor shaft of the motor.

This means that the central motor housing body can be made with a cross-sectional area perpendicular to the motor shaft which is constant or invariable when considered in said axial direction(s), i.e., in the direction of the length of the motor or a part of it.

An advantage of such a compressor assembly in accordance with the invention is therefore that a same manufacturing method can be used for fabricating central motor housing bodies of different lengths for a motor of the compressor assembly, and compressor assemblies of varying lengths can thus easily be produced. Obviously, in housings of a compressor assembly with increasing lengths devices with increasing driving power or compression power or compression pressures or flow rates can be installed.

This is advantageous in that different compressor assemblies can be made, with rather varying characteristics and even in not too large quantities without substantially increasing the production cost and/or complexity.

Another advantage of such a compressor assembly in accordance with the invention wherein channels in the motor jacket are extending in axial directions parallel to an axial direction of a motor shaft is that oil can be transported from one side to the opposite side through the motor jacket. Such a configuration is very efficient for transporting oil through the motor jacket and results in an easy flow of oil and thus in a high cooling or oil transport capacity.

These axially directed channels can also be easily combined or connected to one another in caps, flanges or covers provided at the opposite sides of the motor jacket, so that different configurations for guiding oil or other substances such as water through the motor jacket can be easily composed by just using caps or covers with different inner channels, even with a single type of motor jacket.

Furthermore, oil-injected types of compressor elements are used on a large scale, in large quantities and they have a large variance in drive motor frame sizes, while oil-free or oil-less compressor assemblies are less frequently used, are produced in smaller quantities and there is less variance in size or capacity. So, the fabrication of oil-free or oil-less compressor assemblies of varying types is from a cost perspective usually not very feasible, since the quantities to be produced are too small.

An additional advantage of the provided solution with axially aligned channels in a central motor housing body is that it makes the production possible of motor housings with different lengths in an identic or almost identic fabrication process. This opens the way for the fabrication of varying types of compressor assemblies with an oil-free or oil-less compressor element at an acceptable cost, even if only small batches of each type need to be produced.

In a preferred embodiment of a compressor assembly according to the invention the central motor housing body is therefore fabricated by extrusion.

An extrusion process is of course very suitable for fabricating objects having a cross-section which is invariable or almost invariable in an axial direction.

An extrusion process is also extremely interesting when objects of varying lengths, but with similar cross-section or profile must be manufactured, which is completely not the case when a casting process is used, since any modification to a design would require a different mold.

Indeed, a same extrusion die can be used for manufacturing a part with the same extrusion profile for various lengths. On the other hand, compared to a casting process, extrusion technology requires a higher initial investment.

Nevertheless, since the same extrusion die can be used for motor housings of varying length, the disadvantage of higher initial investment can be compensated by the advantage that the same extrusion technology can be used for different types of housings without any extra investment, which is not the case when casting technology is applied. So, the total amount of products (of different types) to be produced can be high enough to justify the initially high investment.

What's more, the technique is more practical for producing motor housings of different lengths, so that the overall advantage of extrusion is largely compensating the burden of initial high investment. This is especially interesting for producing compressor assemblies comprising an oil-free compressor element, since the oil-free market is such that only smaller batches of each type of compressor assembly are required.

BRIEF DESCRIPTION OF THE DRAWINGS

The invention will further be illustrated with references to the drawings, wherein.

DETAILED DESCRIPTION OF EMBODIMENT(S)

Figures 1, 2:
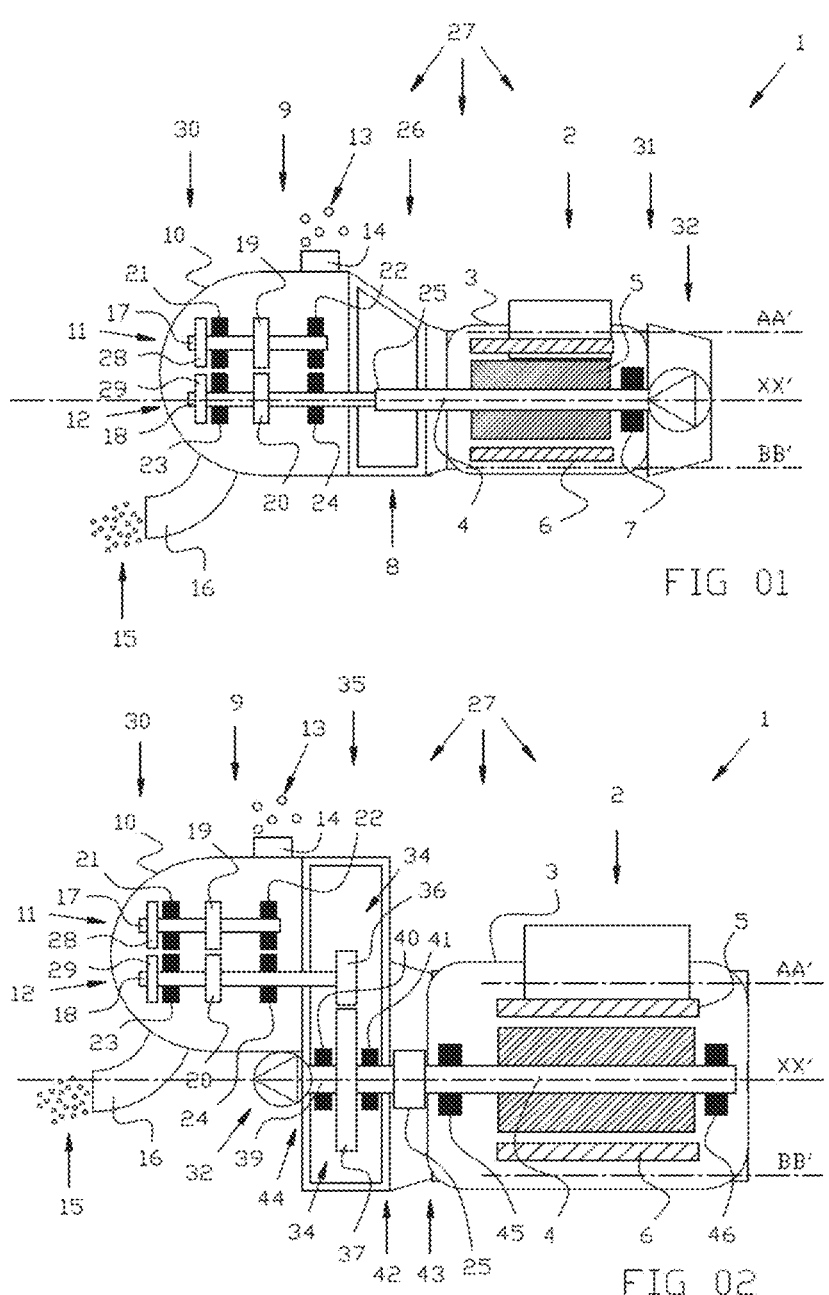
FIG. 1 is a cross-sectional schematic drawing of a part of a first embodiment of a compressor assembly in accordance with the invention.
FIG. 2 is a similar cross-sectional schematic drawing of a part of a second embodiment of a compressor assembly in accordance with the invention.

FIG. 1 illustrates a part of a first embodiment of a compressor assembly 1 in accordance with the invention. The compressor assembly 1 comprises a motor 2, which is in this case an electric motor, which is mounted in a motor housing 3 and which comprises a motor shaft 4 extending in an axial direction XX' through the motor housing 3. The motor shaft 4 is provided with a motor rotor 5 which is rotating with the motor shaft 4 in motor stator windings 6 which are fixedly mounted in the motor housing 3. The rotor shaft 4 is supported in the motor housing 3 in a rotatable manner by means of a motor shaft bearing 7. As an alternative it is not excluded from the invention to use a pair of motor shaft bearings for that purpose.

At a drive side 8 of the motor 2, a compressor element 9 is coupled to the motor 2. As explained in the introduction, the invention is of particular interest for compressor assemblies 1 wherein this compressor element 9 is an oil-free or oil-less compressor element 9, but this is not necessarily the case.

The compressor element 9 is mounted in a compressor housing 10 and comprises compressor rotors 11 and 12 which can work with one another for compressing fluid 13 supplied to the compressor element 9 at a compressor inlet 14. Compressed or pressurized fluid 15 is discharged at a compressor outlet 16 for being supplied to a consumer or a network of consumers of pressurized or compressed fluid 15.

The compressor rotors 11 and 12 comprise each a compressor rotor shaft, respectively compressor rotor shaft 17 and compressor rotor shaft 18, on which in a central part a rotor is provided, respectively compressor rotor 19 and compressor rotor 20. The compressor rotor 19 can be a female rotor 19 which is collaborating with a male rotor 20 which is forming the other compressor rotor 20, or vice versa. In practice, the compressor rotors 19 and 20 can each for example be a screw rotor of a screw compressor element, or a tooth rotor of a tooth compressor element, but other types are not excluded from the invention.

In a preferred embodiment of a compressor assembly in accordance with the invention, the compressor element 9 of the compressor assembly 1 is an oil-less rotor compressor element 9 or is an oil-less tooth compressor element 9 wherein the one or more compressor rotors 11 and/or 12 driven by the motor 2 are one or more compressor rotors or compressor teeth 19 and/or 20.

The compressor rotor shafts 17 and 18 are each supported in a rotatable manner in the compressor housing 10 by a pair of compressor shaft bearings, respectively a pair of compressor shaft bearings 21 and 22 and a pair of compressor shaft bearings 23 and 24.

In order to drive the compressor element 9, or more precisely the compressor rotors 11 and 12 of the compressor element 9, by means of the electric motor 2, the motor shaft 4 is coupled in a direct manner to the compressor rotor shaft 18 of the compressor rotor 12 by a direct coupling 25 of the concerned shafts 4 and 18. The coupling 25 between a free end of the motor shaft 4 and a free end of the compressor rotor shaft 18 is located in an intermediate housing compartment 26 provided between the motor housing 3 and the compressor housing 10.

The motor housing 3, the compressor housing 10 and the intermediate housing compartment 26 form together the compressor assembly housing 27.

In this case the compressor rotor 12 is directly driven by the motor shaft 4, while the compressor rotor 11 is driven indirectly by means of the interaction between a couple of timing gears 28 and 29, mounted at a non-drive end 30 of respectively the compressor rotor shaft 17 and the compressor rotor shaft 18.

Finally, at a non-drive side 31 of the motor 2, i.e., the side opposite to the drive side 8 where the motor 2 is coupled to the compressor element 9, the compressor assembly 1 is furthermore provided with on oil pump 32. This oil-pump 32 is integrated in the motor housing 3 or is mounted on the motor housing 3 or on a motor housing cover of that motor housing 3.

This oil-pump 32 is also directly driven by the motor shaft 4 of the electric motor 2 and is intended for providing a driving force for circulating oil in an oil circulation system
33 of the compressor assembly 1. This oil circulation system
33 is intended for providing oil to components of the
compressor assembly 1 for lubrication purposes or for
cooling purposes or both.

Components of the compressor assembly 1 that typically
need lubrication are for example bearings such as motor
shaft bearing 7 or compressor shaft bearings 21 to 24, or are
gears, such as timing gears 17 and 18. A component that
needs cooling is for example the electric motor 2, com-
pressed fluid 15 at an outlet 16 of the compressor element 9,
the compressor element 9 itself or other elements of the
compressor assembly 1. The oil circulation system 33 is not
represented in FIG. 1, but it will be discussed more in detail
with respect to FIGS. 3 and 4, for example.

FIG. 2 illustrates a part of a second embodiment of a
compressor assembly 1 in accordance with the invention,
which is very similar with the embodiment represented in
FIG. 1.

A first difference with the embodiment of FIG. 1 is that the
motor shaft 4 is this time not coupled by a direct coupling
25 to a compressor rotor shaft 18, as was the case in FIG. 1.
In the embodiment of FIG. 2 the motor shaft 4 is coupled or
interconnected to the compressor rotor shaft 18 of the
compressor element 9 in an indirect manner by means of an
intermediate gearwheel transmission 34 or gearbox. This
intermediate gearwheel transmission 34 or gearbox is
housed in an intermediate gearwheel transmission housing
35, which is positioned in between the compressor housing
10 and the motor housing 3.

The intermediate gearwheel transmission 34 is in this case
composed of a pair of gearwheels 36 and 37 which inter-
mesh. The gearwheel 36 is a driven pinion gear 36 which is
mounted fixedly at a free end 38 of the compressor rotor
shaft 18, which is extending into the intermediate gearwheel
transmission housing 35.

The other gearwheel 37, often designated as being a bull
gear 37, of the intermediate gearwheel transmission 34 is a
driving gearwheel 37 which is mounted fixedly on an
additional gearwheel transmission shaft 39, which is sup-
ported rotatably in the intermediate gearwheel transmission
housing 35 by means of a pair of bearings 40 and 41.

The additional gearwheel transmission shaft 39 is directly
coupled to the motor shaft 4 by means of a direct coupling
25 which couples a free end 42 of the additional gearwheel
transmission shaft 39 to a free end 43 of the motor shaft 4.
The concerned shafts 4 and 39 are both extending into an
intermediate housing compartment 25. In a possible embodi-
ment, the direct coupling 25 consists of a flexible coupling
which can cope with misalignments of the motor shaft 4 and
the gearwheel transmission shaft 39.

This intermediate housing compartment 25 is located
between the intermediate gearwheel transmission housing
35 and the motor housing 3, and the compressor housing 10,
the intermediate gearwheel transmission housing 35, the
intermediate housing compartment 25 and the motor hous-
ing 3 form together the compressor assembly housing 27 in
this example.

Another difference between the embodiment of FIG. 2
and the embodiment of FIG. 1 is the position of the oil pump
32. In the embodiment of FIG. 2, the oil pump 32 is mounted
directly on a free end 44 of the additional gearwheel
transmission shaft 39 opposite to the free end 42 of that shaft
39.

The additional gearwheel transmission shaft 39 is extend-
ing outwards from the intermediate gearwheel transmission
housing 35 in a direction towards the compressor element 9.

So, in the case of FIG. 2 it can be said that the oil pump 32
is coupled to the electric motor 2 at a drive side 8 of this
motor 2, while in FIG. 1 this oil pump 32 was at the
non-drive side 31. It is of course not excluded from the
invention to mount the oil pump 32 in a similar position as
was the case in the embodiment of FIG. 1, at a non-drive side
31 of the motor housing 3.

Still another difference with the first embodiment of FIG.
1 is that in the embodiment of FIG. 2 the motor shaft 4 is not
supported by a single bearing 7 but by a pair of motor shaft
bearings 45 and 46.

Figure 3:
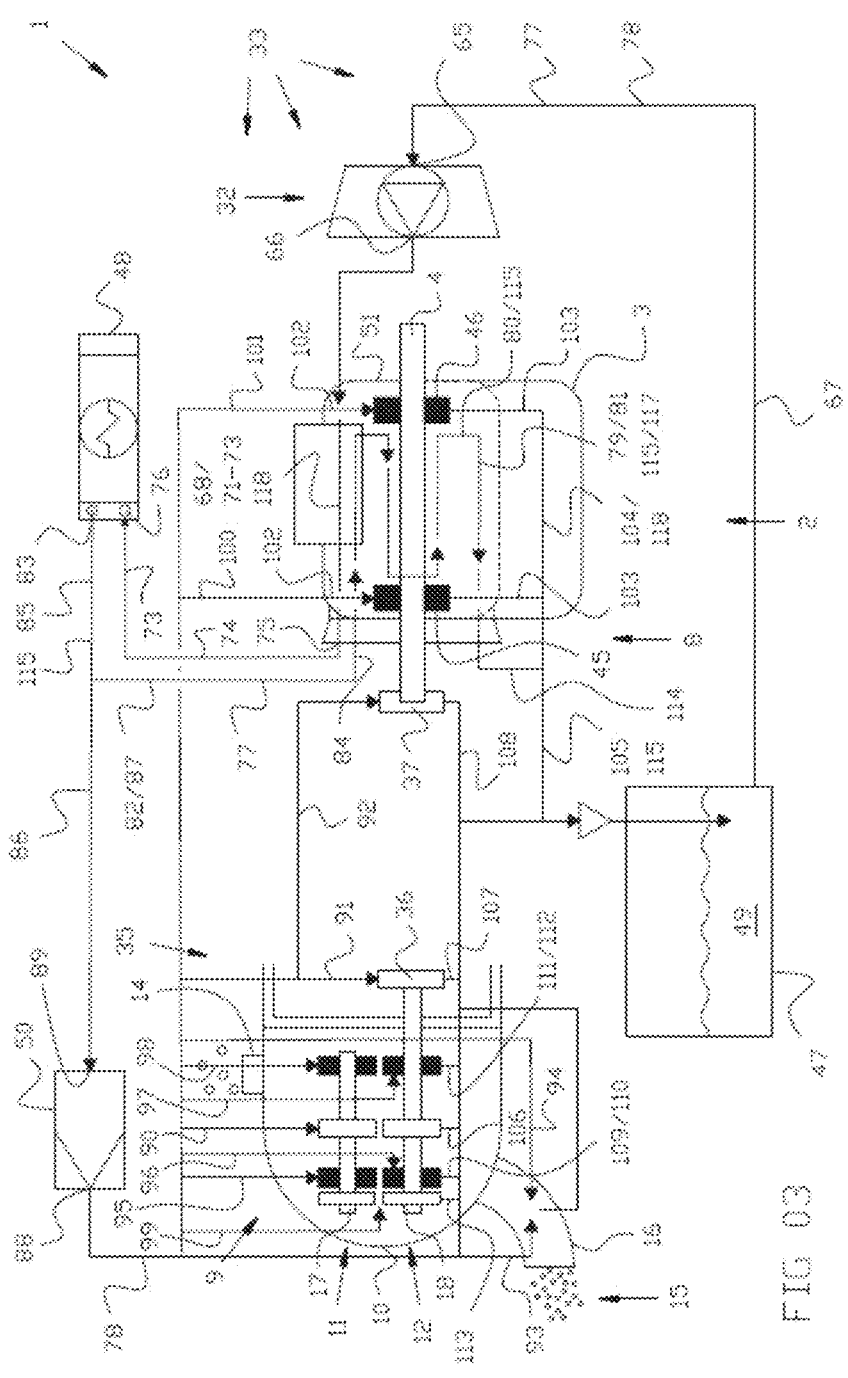
FIG. 3 is a schematic representation of a complete compressor assembly in accordance with the invention comprising an oil-free compressor element with pre-cooled oil injection.

FIG. 3 illustrates schematically a compressor assembly 1
according to the invention in its entirety. Elements already
described with respect to FIGS. 1 and 2 are repeated in this
FIG. 3 in a kind of exploded view way. Other elements of the
compressor assembly 1 are added which are mainly illus-
trating details of the oil circulation system 33 for cooling and
lubricating components of the compressor assembly 1.

This oil circulation system 33 comprises an oil reservoir
47, an oil cooler 48 for cooling oil 49 circulating through the
oil circulation system 33, and an oil filter 50 for filtering oil
49 flowing through lines of the oil circulation system 33.

The oil circulation system 33 comprises oil lines which
interconnect components of the compressor assembly 1,
such as the motor 2 and the oil cooler 48 or the oil filter 50
and the oil cooler 48 and so on. For circulating oil 49
through the oil lines of the oil circulation system 33 from the
oil reservoir 47 to the concerned components of the com-
pressor assembly 1 to be cooled and/or lubricated and back
to the oil reservoir 47, the oil circulation system 33 com-
prises also an oil pump 32 which provides the needed
driving force. According to the invention this oil-pump 32 is
preferably integrated in the motor housing 3 or is mounted
on a motor housing cover provided at a non-drive side 31 of
the motor housing 3.

This is advantageous, first of all since the oil-pump 32 can
in that way be driven by the same motor shaft 4 of the
electric motor 2 which is driving the compressor rotors 11
and 12 of the compressor element 9. This compact design
has still another advantage as will become clear hereafter.

Figures 7, 8:
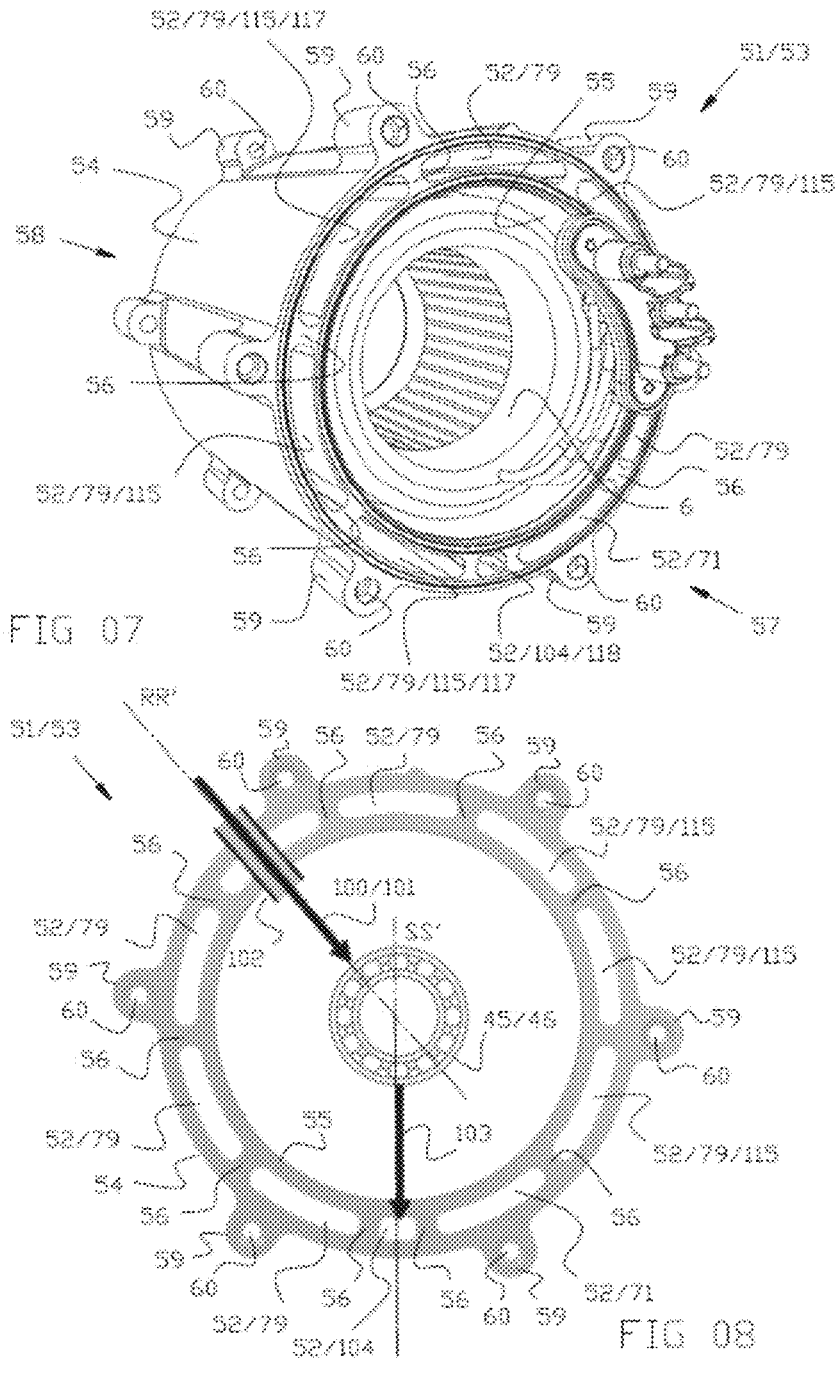
FIG. 7 is a perspective view of the finished central motor housing body of FIG. 6 after a stator has been inserted.
FIG. 8 is a front view on the finished central motor housing body indicated by arrow F08 in FIG. 6, wherein a motor shaft bearing and oil injection to that motor shaft bearing is illustrated.
Figure 13:
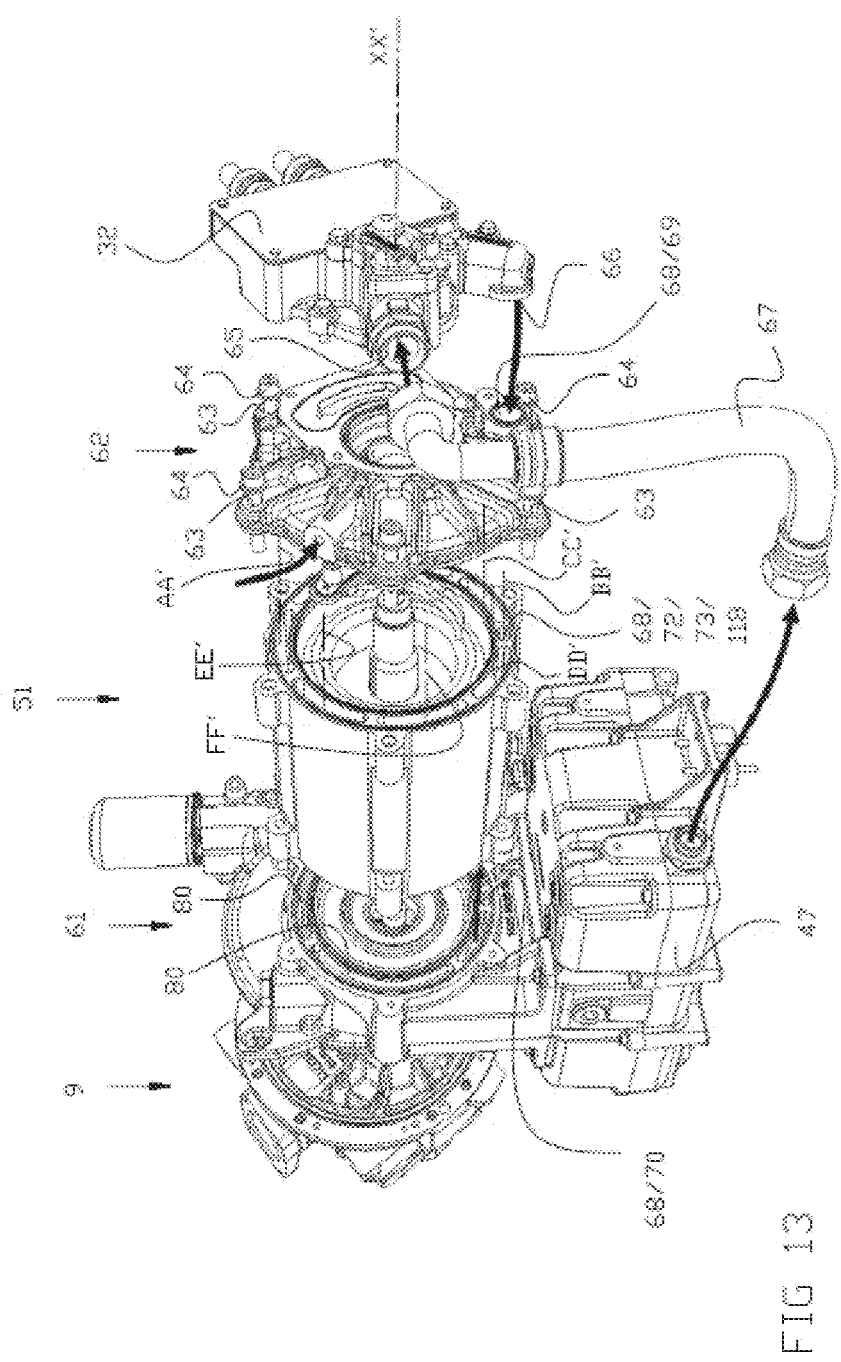
FIG. 13 is a perspective representation of a partly exploded view of a more realistic version of a compressor assembly in accordance with the invention.

As is illustrated in FIGS. 7 and 13 for example, the motor
housing 3 of the motor 2 comprises a central motor housing
body 51 executed as a jacket in which motor jacket channels
52 are provided which are connected to oil lines of the oil
circulation system 33 for circulating oil 49 through the
motor jacket 51.

In a preferred embodiment of a compressor assembly 1 in
accordance with the invention, and as is also the case in the
represented figures, these oil motor jacket channels 52 are
extending in axial directions AA', BB', CC', DD', EE', FF',
. . . parallel to the axial direction XX' of the motor shaft 4
of the motor 2 and the motor jacket channels 52 extend
through the entire central motor housing body 51 between
the non-drive side 31 and the drive side 8 of the motor 2.
This is for example clearly illustrated in FIG. 13.

Nevertheless, it is not excluded from the invention to
provide the central motor housing body 51 with motor jacket
channels 52 which are configured in a completely different
way, with parts extending in a circumferential direction or
which are spiraling around the motor housing axis and so on.

In the embodiment here discussed, the central motor
housing body 51 is formed by an essentially cylindrical
element 53 which can be considered as being a double-
walled element 53 with an outer wall 54 and an inner wall
55 which are connected to one another by means of partition
walls 56, which separate the different motor jacket channels
52 from one another. This is for example clearly illustrated in FIGS. 7 and 8. In this case there are eight such motor jacket channels 52, seven of which having a similar width and occupying the main part of the space between the inner wall 55 and the outer wall 54. The eighth motor jacket channel 52 at the bottom of the cylindrical element 53 has a substantially smaller width and cross-section. Obviously, according to the invention any other number of motor jacket channels 52 can be applied in the motor jacket 51.

At both extremities 57 and 58 of the central motor housing body 51 the outer wall 54 is externally provided with a number of bulges 59, which are each provided with a hole 60, which is possibly an internally threaded hole 60 or a through-hole 60 without internal thread. In the case of the figures, there are at each of the extremities 57 and 58 six such bulges 59 which are spaced apart from one another over the circumference of the cylindrical element 53 in a symmetrical manner.

Furthermore, the central motor housing body 51 is at each side 58 and 59 closed off by means of a motor housing cover 61 and 62 (see FIG. 13). In particular, the motor housing 3 comprises at a drive side 8 of the central motor housing body 51 a drive side motor housing cover 61 adjacent to the compressor rotors 11 and 12 driven by the motor 2 and comprises at a non-drive side 31 of the central motor housing body 51 a non-drive side motor housing cover 62 at the opposite side of the central motor housing body 51.

These covers 61 and 62 are provided with holes 63 and bolts 64 corresponding to the bulges 59 and (threaded) holes 60 for bolting the covers 61 and 62 against the central motor housing body 51.

The oil-pump 32 has an oil-pump inlet 65 and an oil-pump outlet 66. The oil-pump inlet 65 is connected by an oil-suction line 67 to the oil reservoir 47.

According to the invention the motor jacket 51 comprises at least a first group 117 of motor jacket channels 52 composed of one or more such motor jacket channels 52. This first group 117 of motor jacket channels 52 is intended for cooling the motor 2. The first group 117 of motor jacket channels 52 intended for cooling can be composed of all the motor jacket channels 52, only a part of the motor jacket channels 52 and even just a single motor jacket channel 52.

Another very general aspect of the invention is that the compressor assembly housing 27 comprises one or more pass-through channels for guiding oil 49 through the compressor assembly housing 27. According to the invention, such a pass-through channel furthermore forms at least a part of an afore-mentioned oil line which interconnects components of the compressor assembly 1.

In short this means that according to the invention at least the motor cooling is at least partly provided by a first group 117 of motor jacket channels 52 integrated in the motor jacket 51 and at least one oil line is at least partly integrated in the compressor assembly housing 27.

In the example of FIG. 3, the compressor assembly housing 27 and more particularly the part of the compressor assembly housing 27 formed by the motor housing 3 is provided with such a pass-through channel 68. The pass-through channel 68 passes in this example through the central motor housing body 51 and through the motor housing covers 61 and 62 provided at the opposite extremities 57 and 58 of the central motor housing body 51. To that purpose the covers 61 and 62 are also provided with pass-through openings 69 and 70 which fit to a channel 71 of the afore-mentioned axially directed channels 52 of the central motor housing body 51, so to form together the pass-through channel 68.

This is practical example of the more general aspect of the invention that in a preferred embodiment of a compressor assembly 1 in accordance with the invention the motor jacket 51 comprises a second group of motor jacket channels 52 composed of one or more such motor jacket channels 52 which are not motor jacket channels of the first group 117 and which are thus not intended for the motor cooling, but which form each a pass-through channel or a part of such a pass-through channel for guiding oil 49 through the motor jacket 51.

Figures 9, 10:
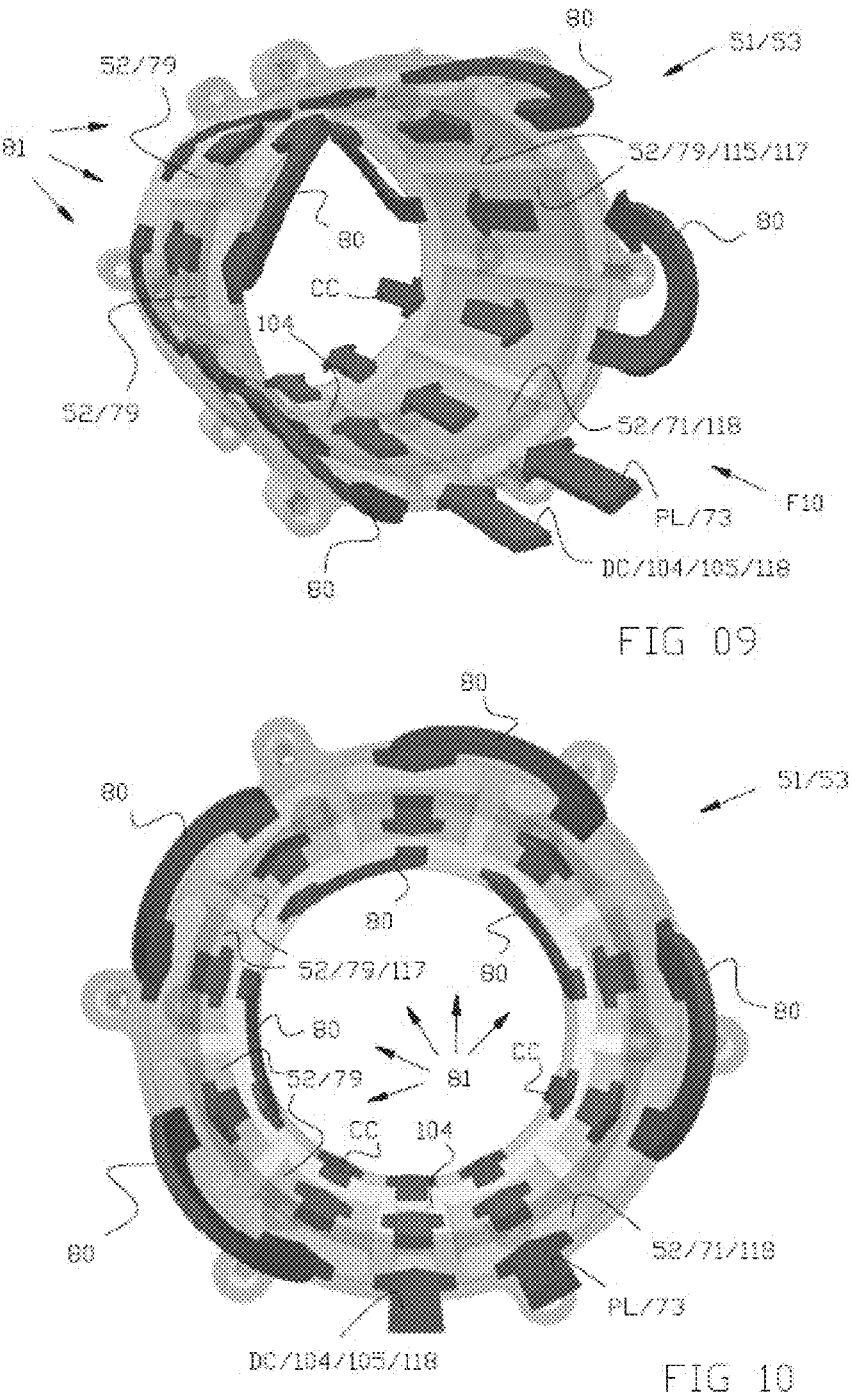
FIG. 9 is a perspective view on the finished central motor housing body similar to the perspective view of FIG. 6 wherein the direction of oil flow in a first configuration is indicated by means of arrows.
FIG. 10 is a front view along the arrow F10 in FIG. 9 illustrating the same oil flows in the first configuration through the channels in the finished central motor housing body.

In this case the oil-pump 32 is at its outlet 66 directly connected to this pass-through channel 68 for forming a part 72 of an oil-pump pressure line 73 of the oil-pump 32 which is connected to the oil-cooler 48. Reference is also made to FIGS. 9 and 10 in which the channel 71 for the pass-through channel 68 is indicated and wherein the flow of oil 49 through the oil-pump pressure line 73 coming from the oil-pump 32 is indicated by arrows PL.

The remaining part 74 of this oil-pump pressure line 73 which extends between the motor housing 3 and the oil-cooler 48 is formed by an oil-line 74 which is connected at an outlet 75 of the pass-through channel 68 at the drive-side 8 of the motor housing 3. This oil-line 74 is at its other end connected to the inlet 76 of the oil-cooler 48.

The integration of a part 72 of the oil-pump pressure line 73 to the oil-cooler 48 in the motor jacket 51 has a great advantage for as far as the compactness and robustness of the configuration of the compressor assembly 1 is concerned. The risk for oil leaks at the oil-pump outlet 66 is with this configuration also very much reduced.

It is clear that in this example the oil-pump pressure line 73 is only partly integrated in the compressor assembly housing 27, but in another possible embodiment the oil-cooler 48 could be mounted in a housing part of the compressor assembly housing 27 and the oil-pump pressure line 73 could be entirely integrated in the compressor assembly housing 27, for example partly by means of a motor jacket channel 52 of the second group in combination with a channel provided in other parts of the compressor assembly housing 27.

In the case of FIG. 3, there is only a single oil-line from the oil reservoir 47 to the oil-pump 32 through the motor jacket 51 to the oil-cooler 48, which oil-line is composed of the suction-line 67 and the oil-pump pressure line 73. This means that the totality of the oil 49 sucked by the oil-pump 32 through the suction-line 67 is transferred to the oil-cooler 48, so that all the oil 49 circulated by the oil circulation system 33 of the compressor assembly design 1 is cooled before it is supplied to the different components of the compressor assembly 1 to be cooled and/or lubricated.

Another aspect of the compressor assembly 1 of the invention illustrated in FIG. 3 is that the oil circulation system 33 of the compressor assembly 1 comprises at least one first circulation loop 77 and at least one second circulation loop 78 wherein oil 49 is circulating between the oil reservoir 47 and the oil-cooler 48 and back. The first circulation loop 77 is an unfiltered circulation loop 77 wherein no oil filter 50 is included. The second circulation loop 78 on the other hand is a filtered circulation loop 78 in which the oil filter 50 is provided for filtering the oil 49.

It is not excluded from the invention to provide more than one unfiltered circulation loop 77 and/or more than one filtered circulation loop 78.

In a compressor assembly 1 according to the invention, one or more motor jacket channels 79 are included in the first unfiltered circulation loop 77 or one of the present unfiltered circulation loops 77, when there is more than one unfiltered circulation loop 77. These motor jacket channels 79 form a first group 117 of motor jacket channels 79 which are forming motor cooling channels 79 for cooling the motor housing jacket 51 and for transferring heat generated in the motor 2 to the oil 49 flowing through the motor cooling channels 79 and removing this heat in order to cool the motor 2 itself.

As can be deduced from FIG. 13 and is schematically illustrated in FIGS. 9 to 12 by means of arrows, the motor housing covers 61 and 62 comprise one or more interconnection channels 80 which collaborate in the assembled status with axially directed cooling channels 79 in the central motor housing body 51 for interconnecting the concerned cooling channels 79 in the central motor housing body 51 and for forming a single composed cooling channel 81 for cooling of the motor housing jacket 51 and motor 2. This single composed cooling channel is indicated by arrows CC in FIGS. 9 to 12.

FIGS. 9-12 illustrate a compressor assembly 1 with a single composed cooling channel 81. However, in other embodiments of a compressor assembly 1 in accordance with the invention it is of course also possible to provide more than one composed cooling channel 81 or to provide only uncomposed, singular channels, which are in that case all cooling channels 52 which are parallel to one another.

A motor cooling set up could for example be designed wherein a first composed cooling channel 81 is circulating clockwise and a second composed cooling channel 81 is circulating counterclockwise. Such a design is obviously somewhat more complex but has the advantage of halving the flow rate through the composed cooling channels 81. As a result, the pressure drop over the composed cooling channels 81 is also reduced by a factor which is approximately four! This might be particularly interesting for bigger sizes of motors 2 where a large pressure drop over the composed cooling channels 81 might cause too high pressures in the cooling circuit.

For supplying cooled oil 49 to the motor jacket 51 an oil line 82 is provided between an oil-cooler outlet 83 of the oil-cooler 48 and a cooling channel inlet 84 of at least one cooling channel 79 of the first group 117 in the central motor housing body jacket 51 or a composed cooling channel 81.

In more general terms, according to the invention it is preferred that the compressor assembly 1 comprises one or more oil cooling line sections 115 which extend(s) from the oil cooler 48 to the oil reservoir 47 and the first group 117 of motor jacket channels 79 are according to the invention preferably each included in one of the one or more oil cooling line sections for cooling the motor 2.

In the case of FIG. 3 such an oil cooling line section 115 is composed of the oil line 82 between the oil cooler 48 and the motor jacket 51, the composed cooling channel 81 which is composed of multiple motor jacket channels 79 of the first group 117 interconnected by means of interconnection channels 80 and a drain channel 105.

An oil-line 85 of cooled oil 49 is connected to the oil-cooler outlet 83 which is branched upstream of the oil-filter 50 into a first branch 86 which is forming an oil line 86 towards the oil-filter 50 and a second branch 87 for forming the oil line 82 towards said cooling channel 79 or single composed cooling channel 81 in the motor housing jacket 51.

Furthermore, in the example of FIG. 3 the oil circulation system 33 of the compressor assembly 1 comprises a multitude of oil injection lines for providing cooled filtered lubrication oil 49 to components of the compressor assembly 1 which are connected to the filter outlet side 88 of the filter 50. The oil filter 50 itself is provided in the oil-line 86 of cooled oil 49 which is extending between the oil cooler outlet 83 and the filter inlet side 89. Since in the case of FIG. 3 the oil 49 is cooled before it is injected, the oil circulation system 33 can be considered as begin a pre-cooled oil injection system.

In particular, the oil circulation system 33 is equipped with the following oil injection lines 90-99 for providing filtered lubrication oil to components of the compressor element 9 of the compressor assembly 1:

a filtered oil injection line 90 towards a compressor rotors 11 and/or 12;

filtered oil injection lines 91 and 92 towards a driven gearwheel 36 or a driving gearwheel 37 of an intermediate gearwheel transmission 34 between the motor 2 and the compressor element 9;

a non-drive side oil injection line 93 for injecting filtered oil 49 towards a compressor outlet 16;

a drive side oil injection line 94 for injecting filtered oil 49 towards a compressor outlet 16;

a filtered oil injection line 95 towards a non-drive side bearing 21 of a female compressor rotor shaft 17;

a filtered oil injection line 96 towards a non-drive side bearing 23 of a male compressor rotor shaft 18;

a filtered oil injection line 97 towards a drive side bearing 24 of a male compressor rotor shaft 18;

filtered oil injection line 98 towards a drive side bearing 22 of a female compressor rotor shaft 17; and, a filtered oil injection line 99 towards timing gearing 28 or 29.

In the case of an embodiment wherein the compressor element 9 is an oil-less or an oil-free compressor element 9, there is of course no filtered oil injection line 90. Also, in other embodiments more or less oil lines can be applied than is the case in the here-discussed example.

The oil circulation system 33 is also equipped with the oil injection lines 100 and 101 for providing filtered lubrication oil to components of the motor 2 of the compressor assembly 1. In particular is the motor 2 in the case of FIG. 3 provided with:

a drive side filtered oil injection line 100 towards a motor shaft bearing 45; and, a non-drive side filtered oil injection line 101 towards a motor shaft bearing 46.

In FIG. 8 is illustrated how these oil injection lines 100 and 101 for supplying filtered and cooled oil 49 towards the motor bearings 45 and 46 are realized. For each bearing 45 and 46 supporting the motor shaft 4 an oil injection channel 102 is provided through the motor housing 3 for supplying filtered oil to a concerned motor shaft bearing 45 or 46.

In a possible embodiment these oil injection channels 102 extend through one of the covers 61 or 61 of the motor jacket 51 or through the motor jacket 51 itself.

In a similar way there are also oil drain channels 103 for draining filtered lubrication oil 49 from the concerned motor shaft bearing 45 or 46 out of the motor housing and back to the oil reservoir 47.

These oil injection channels 102 and oil drain channels 103 are extending in a radial direction RR' or SS' towards the motor shaft 4 or away from the motor shaft 4 or comprise at least a part which is extending in such a radial direction RR' or SS'.

In a preferred embodiment of a compressor assembly 1 according to the invention the motor housing 3 is provided with an axially extending pass-through channel 104, which is in principle similar to the pass-through channel 68 for the oil-pump pressure line 73 and which passes through the central motor housing body 51 and through openings in the motor housing covers 61 and 62 provided at opposite ends 57 and 58 of the central motor housing body 51.

This axially extending pass-through channel 104 is a drain channel 104 and is forming a part of oil drain lines 105 for draining oil 49 coming from the motor shaft bearings 45 and 46 towards the oil reservoir 47. The axially extending pass-through channel 104 is connected to the afore-mentioned radially extending parts 103 for forming the oil drain lines 105. The flow of drained oil 49 is indicated in FIGS. 9 to 12 by arrows DC.

In more general terms, according to the invention, at least one such pass-through channel 68 or 104 and preferably more than one such pass-through channels 68 and 104 are provided in the compressor assembly housing 27 for guiding oil 49 through the compressor assembly housing 27. In the embodiment of FIG. 3 the pass-through channels 68 and 104 are mainly extending only through the motor housing 3, but in other embodiments such pass-through channels 68 and 104 can also extend through other parts of the compressor assembly housing 27.

Furthermore, according to the invention, such a pass-through channel 68 or 104 forms at least a part of an oil line which interconnects components of the compressor assembly 1. It is not excluded from the invention that such a pass-through channel 68 or 104 is itself not just a part of an afore-mentioned oil line, but is entirely forming such an oil line between components of the compressor assembly 1.

For example, pass-through channel 68 forms a part 72 of the oil pressure line 73 between the oil-pump 32 and the oil-cooler 48 and pass-through channel 104 forms a part of oil drain lines 105 for draining oil 49 coming from the motor shaft bearings 45 and 46 towards the oil reservoir 47.

In another embodiment of a compressor assembly 1 in line with the invention the oil injection channels 102 can also be executed in a similar way as the axially extending pass-through channel 104, by integrating also these oil injection channels 102 in the motor jacket 51 in an axially extending channel 52 of the motor jacket 51.

Furthermore, the pass-through drain channel 104 is located at the bottom of the motor jacket 51 for receiving lubrication oil 49 for example under the influence of gravity forces, typically in a setup where the motor 2 is oriented horizontally. In other configurations the motor 2 is extending in a vertical direction, which is for example typically the case in oil-injected screw compressor elements 9 and in such a case the lubrication oil 49 flows under the pressure of other forces, typically a driving force generated by an oil pump. It is substantially smaller in cross-sectional size than the other channels 71 and 79 for the oil-pump pressure line 73 and the motor jacket 51 cooling.

Of course, the oil 47 supplied to the compressor components through oil injection lines 90-99 needs also to be drained back to the oil reservoir 47. To that purpose the oil circulation system 33 of the compressor assembly 1 of FIG. 3 comprises the following oil drain lines:

an oil drain line 106 for draining oil coming from a compressor rotor 11 or 12;

oil drain lines 107 and 108 coming from a driven gearwheel 36 or a driving gearwheel 37 of an intermediate gearwheel transmission 34 between the motor 2 and the compressor element 9;

an oil drain line 109 for draining oil 49 coming from a non-drive side bearing 21 of a female compressor rotor shaft 17;

an oil drain line 110 for draining oil coming from a non-drive side bearing 23 of a male compressor rotor shaft 18;

an oil drain line 111 for draining oil 49 coming from a drive side bearing 22 of a female compressor rotor shaft 17;

an oil drain line 112 for draining oil 49 coming from a drive side bearing 24 of a male compressor element rotor 18;

an oil drain line 113 for draining oil 49 coming from timing gearing 28 or 29; and, an oil drain line 114 for draining oil 49 coming from a channel 79 of the first group 117 in the motor jacket 51.

All these oil drain lines 106 to 113 come together and guide the oil 49 back to the oil reservoir 47 for being sucked up again by the oil-pump 32 for a next cycle through the oil circulation system 33.

According to the invention one or more of all these oil drain lines 106 to 114 or oil injection lines 90 to 101 can be entirely or partly integrated in the compressor assembly housing 27, for example by means of a pass-through channel provided in the motor jacket 1 and/or in other parts of the compressor assembly housing 27.

Figure 4:
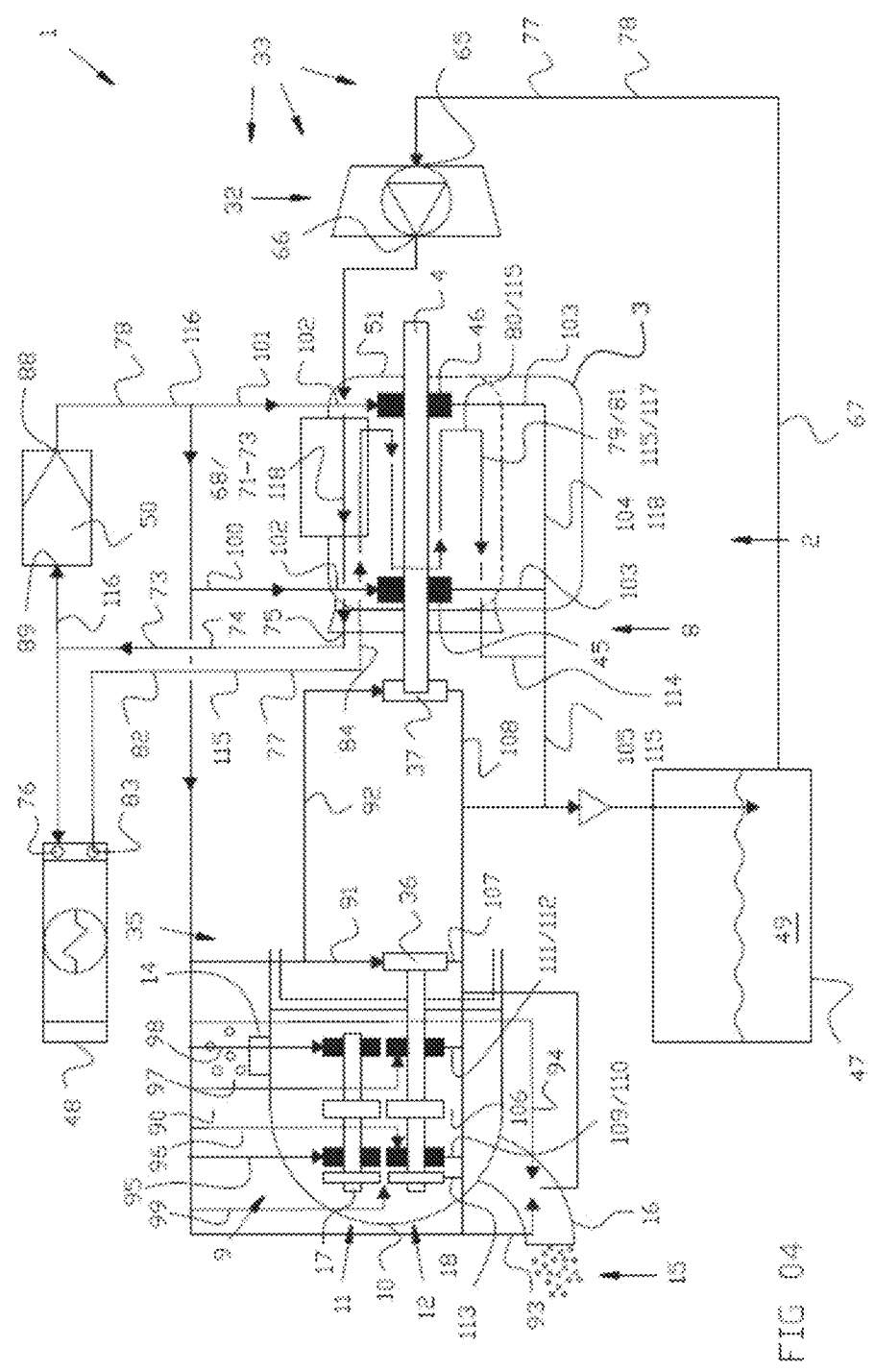
FIG. 4 is a schematic representation similar to the one of FIG. 2 of a complete compressor assembly in accordance with the invention comprising an oil-free compressor element with uncooled oil injection.

FIG. 4 illustrates in a similar way as in FIG. 3 another embodiment of a compressor assembly 1 in accordance with the invention in its entirety.

The greater part of the composing elements are the same as in FIG. 3 and are also indicated with the same reference numbers. The main difference with the embodiment of FIG. 3 is that in the embodiment of FIG. 4 the oil 49 which is supplied to the elements of the compressor element 9 and the bearings 45 and 46 of the motor 2 for being lubricated is not pre-cooled as was the case in the embodiment of FIG. 3.

In the example of FIG. 4 the oil circulation system 33 of the compressor assembly 1 comprises oil injection lines 90-101 for providing uncooled, filtered lubrication oil 49 to components of the compressor assembly 1. This time the oil filter 50 is provided in an oil-line 116 of uncooled oil 49 which is branched-off from the oil-pump pressure line 73 provided between the oil-pump 32 and the oil-cooler 48. This oil-pump pressure line 73 passes again partly through the motor jacket 51 through a pass-through channel 68.

So, the main difference is that in the embodiment of FIG. 3 the oil filter 50 is placed in an oil line branch 86, which is downstream of or behind the oil-cooler 48, while in the embodiment of FIG. 4 the oil filter 50 is placed in an oil line branch 116, which is upstream of or in front of the oil-cooler 48. Apart from the fact that the oil 49 is not cooled before being supplied to the concerned components for lubrication, there is furthermore no other essential difference between both compressor assemblies 1.

Figure 5:
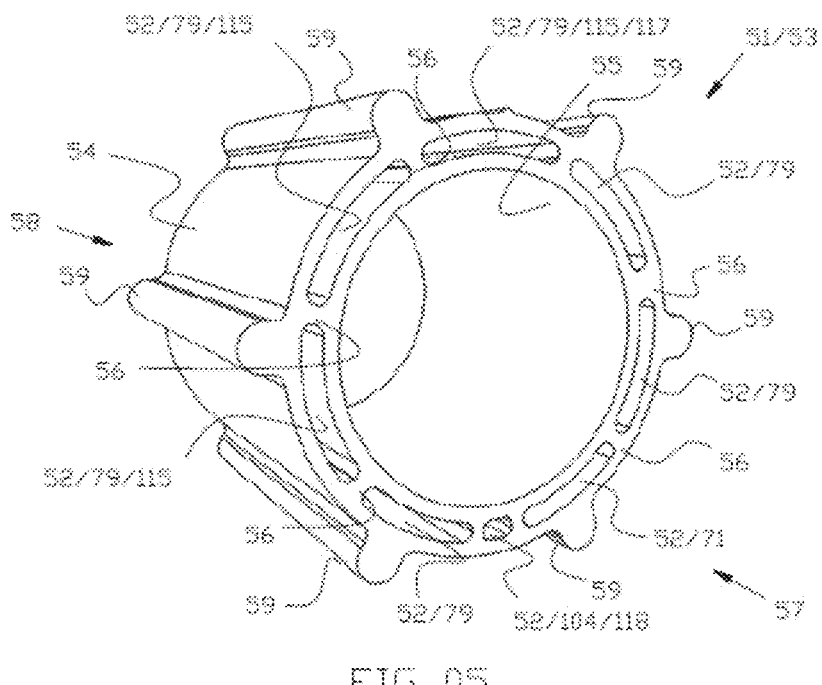
FIG. 5 represents a perspective view of a non-finished central motor housing body of a compressor assembly according to the invention.
Figure 6:
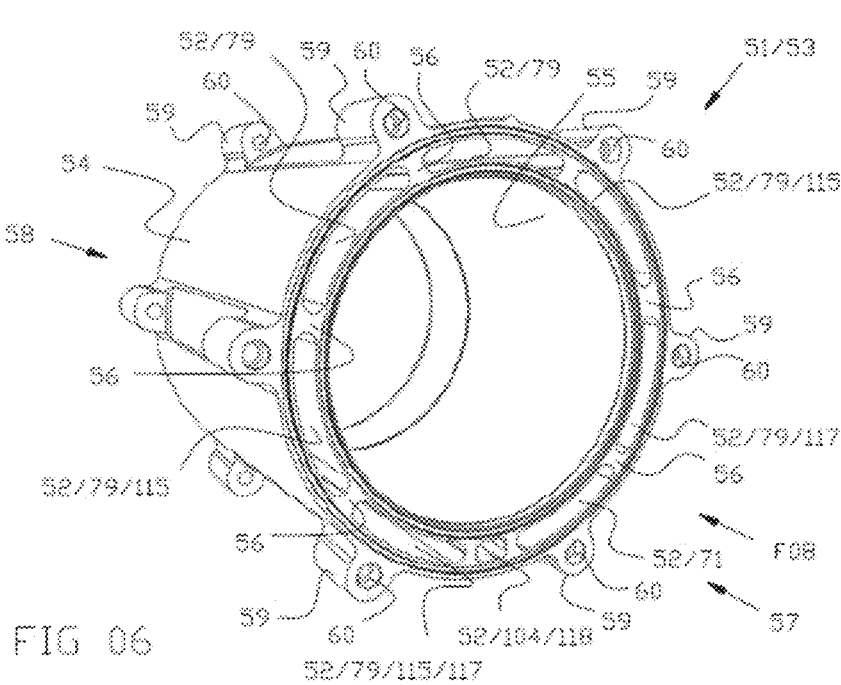
FIG. 6 illustrates a perspective view of a finished version of the same central motor housing body represented in FIG. 5.

FIGS. 5 to 7 illustrate consecutive steps during the fabrication of the central motor housing body 51 of the electric motor according to a method of the invention.

According to the invention the manufacturing of the central motor housing body 51 of the compressor assembly 1 comprises an extrusion step for forming a motor jacket 51 with axially directed channels 52.

FIG. 5 illustrates the still unfinished situation just after the extrusion step has been executed. The central motor housing body 51 has a cross-section which is essentially constant or invariable over at least an important axial part of the central motor housing body 51 and it has already all the important features, also present in the finished central motor housing body 51, such as the shape of a cylindrical, double-walled element 53 wherein axially directed channels 52 are provided between an inner wall 55 and an outer wall 54 separated by partition walls 56. The bulges 59 provided externally on the outside wall 54 are still unfinished and are axially aligned bulges which extend over the total length of the central motor housing body 51.

FIG. 6 illustrates the result after execution of a next step of the method of the invention, wherein intermediate parts of the bulges 59 are removed in a milling or cutting operation. Holes 60 are furthermore provided in the bulges 59, which are possibly provided with an internal thread, or which are executed simply as through-holes 60 without internal thread.

Finally, FIG. 7 illustrates the central motor housing body 51 after the stator 6 of the motor has been inserted in the double-walled, cylindrical element 53.

Figures 11, 12:
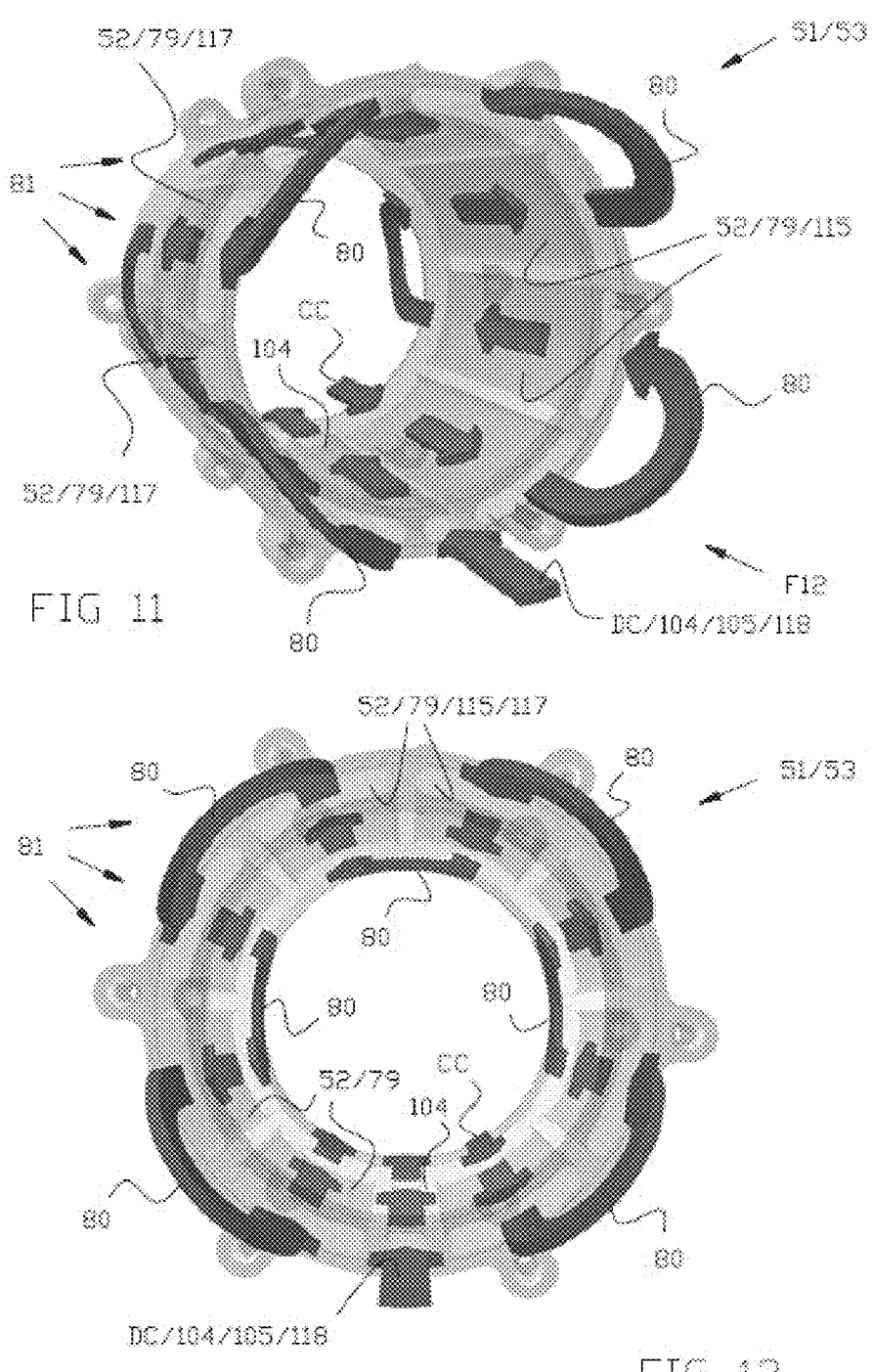
FIG. 11 is a perspective view on the finished central motor housing body similar to the perspective view of FIG. 9 wherein the direction of oil flow in a second configuration is indicated by means of arrows.
FIG. 12 is a front view along the arrow F12 in FIG. 11 illustrating the same oil flows in the second configuration through the channels in the finished central motor housing body.

FIGS. 11 and 12 illustrate a part of a configuration of the oil circulation system 33 in line with the invention which is slightly different from the configuration represented in FIGS. 9 and 10.

The difference is that in the embodiment of FIGS. 11 and 12 there is one channel 52 less in the central motor housing body 51 than is the case in the embodiment of FIGS. 9 and 10. The motor jacket channel 71 which forms a part 72 of the oil-pump pressure line 73 is omitted in the embodiment of FIGS. 9 and 10. As a consequence, the oil-pump pressure line 73 is this time not integrated in the motor jacket 51 and in this example the oil-pump suction line 67 and the oil-pump pressure line 73 should be both connected externally to the oil-pump 32.

Similarly, it is not excluded from the invention to omit the drain channel 104 which is integrated in the motor jacket 51 at the bottom of it and to drain for example the oil 49 coming from the motor bearings 45 and 46 directly into an underlying oil sump by guiding the oil 49 through one or more pass-through channels provided in other parts of the compressor assembly housing 27.

Still other configurations are of course not excluded from the invention and the axially aligned channels 52 in the motor jacket can have a completely different shape or size and the number of channels 52 provided, can be increased or decreased and so on.

Excluding the oil-pump pressure line 73, oil injection lines 102 and/or oil drain line 104 (or any other non-cooling channel) from being integrated in the motor jacket 51 has an advantage in that the cooling performance of the motor 2 can be increased. On the other hand, integrating more oil lines in the motor jacket 51 is advantageous in that the motor 2 can be executed in a more compact format. Possible interesting candidates which could be additionally integrated in the motor jacket 51 for increasing the compactness of the assembly 1 and for reducing risk for oil leaks, is for example oil-pump suction line 67 or any oil injection line 90-101. A disadvantage however of increased integration of oil lines in the motor jacket 51 is that the cooling power of the motor 2 is in that case somewhat reduced.

The remaining FIGS. 14 to 31 illustrate different configurations of compressor assemblies 1 according to the invention wherein a certain degree of integration of components and oil lines in the compressor assembly housing 27 is applied, which is different dependent on the case.

A first part of the integration of components in the compressor assembly housing 27 which is present in all the represented configurations however is that the motor jacket 51 comprises at least a first group 117 of motor jacket channels 79 composed of one or more such motor jacket channels 52 which is intended for cooling the motor 2. In the examples of FIGS. 14 to 31 this first group 117 of motor jacket channels 79 are combined into a single composed cooling channel 81 by means of interconnection channels 80 provided in covers or caps 61 and 62 mounted on opposite sides 57 and 58 of the central motor housing body 51, as was the case in the preceding examples. This is however according to the invention not necessarily the case.

Figure 14:
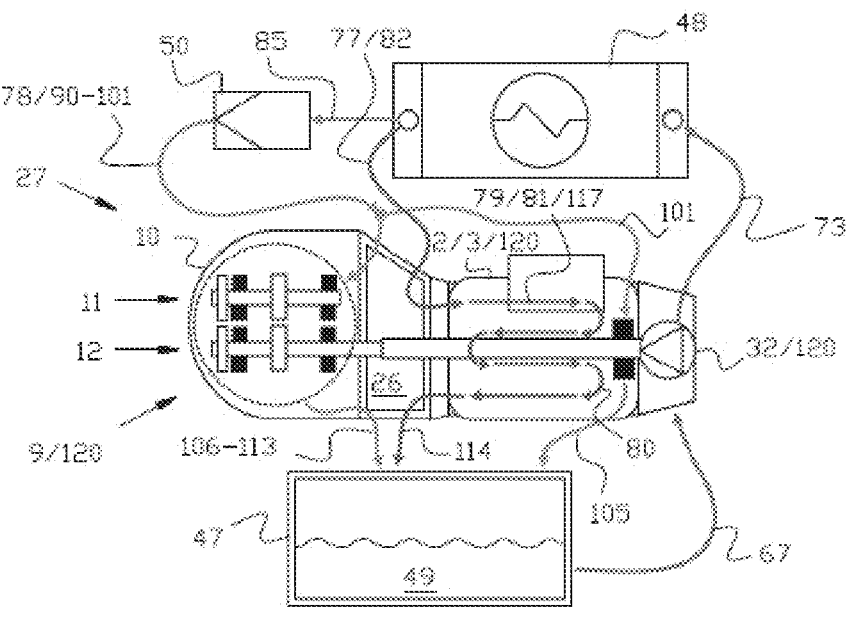
FIG. 14 is a schematic representation of a compressor assembly of a type as represented in FIG. 1 with indication of the main oil streams between components of the compressor assembly and without applying integration of oil lines in the compressor assembly housing apart from the motor jacket cooling channels.

The schematic view of FIG. 14 represents in a simplified manner the main components of a compressor assembly 1, which is similar to the embodiment represented in FIG. 3. Apart from the first group 117 of motor jacket channels 79 there are no other pass-through channels of the compressor assembly 1 in this FIG. 14, which are represented as being integrated in the compressor assembly housing 27. According to the invention one or more of the oil lines 90 to 101 or 106 to 114 represented in the figure could for example be integrated in a part of the compressor assembly housing 27, which is not a part of the motor housing 3.

Figure 15:
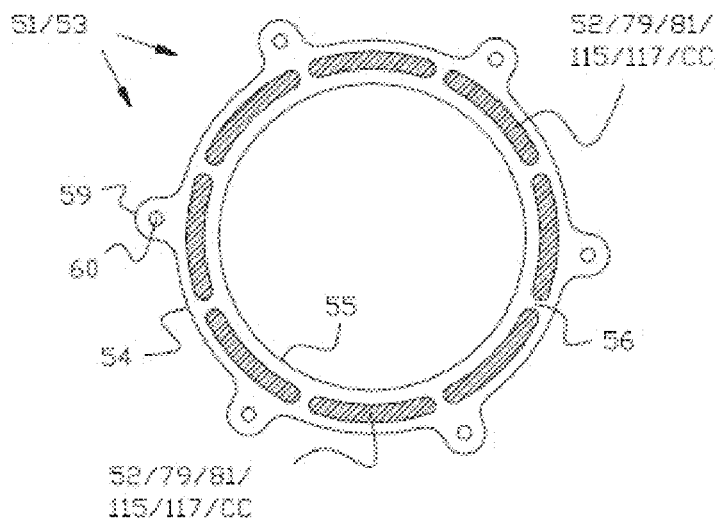
FIG. 15 represents a cross-section through the central motor housing body of the compressor assembly represented in FIG. 14.

In the embodiment of the FIGS. 14 and 15 the motor jacket channels 52 are all of the first group 117 and they form together the composed cooling channel 81 which serves for cooling the motor 2. No channels 52 of the motor jacket 51 are intended for other purposes than for cooling the motor 2.

Figure 16:
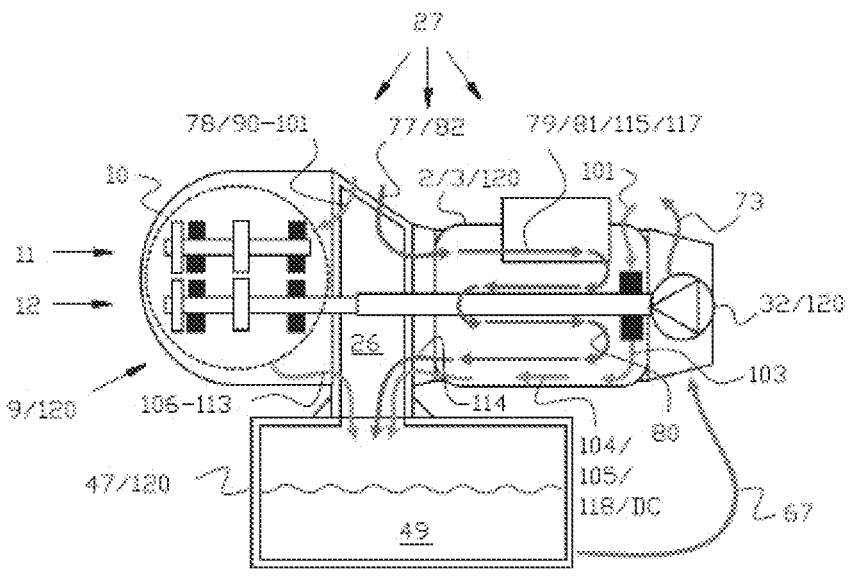
FIG. 16 is a schematic representation similar to the representation of FIG. 14 of a compressor assembly wherein an oil drain line for draining oil coming from a motor bearing is integrated in the motor jacket.
Figure 17:
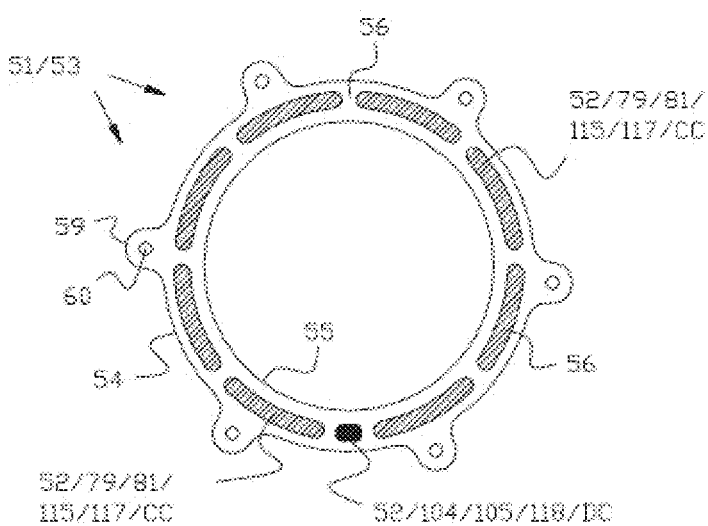
FIG. 17 represents a cross-section through the central motor housing body of the compressor assembly represented in FIG. 16.

FIGS. 16 and 17 illustrate another embodiment of a compressor assembly 1 in accordance with the invention, wherein an oil drain line 105 for draining oil 49 coming from the motor shaft bearing 7 to the oil reservoir 47 is partly or entirely integrated in the motor housing 3. This is similar to what was already the case in the embodiments of FIGS. 3 and 4.

The integration comprises an axially extending pass-through channel 104 formed by the axially extending motor jacket channel 104 for guiding oil 49 through the motor jacket 51, as well as a radially extending pass-through channel 103 which is provided in the compressor assembly housing 27 or motor housing 3 for draining oil 49 from the motor shaft bearing 7 towards the motor jacket 51. The concerned motor jacket channel 104 is not a motor jacket channel 52 of the first group 117, since these motor jacket channels 52 of the first group 117 are intended for cooling the motor 2.

In the embodiment of FIGS. 16 and 17 the motor jacket 51 comprises therefore a second group 118 of motor jacket channels 52 which is composed, in this case, of only one single such motor jacket channel 104, which is intended for draining the oil 49 from the motor shaft bearing 7 to the oil reservoir 47.

Figure 18:
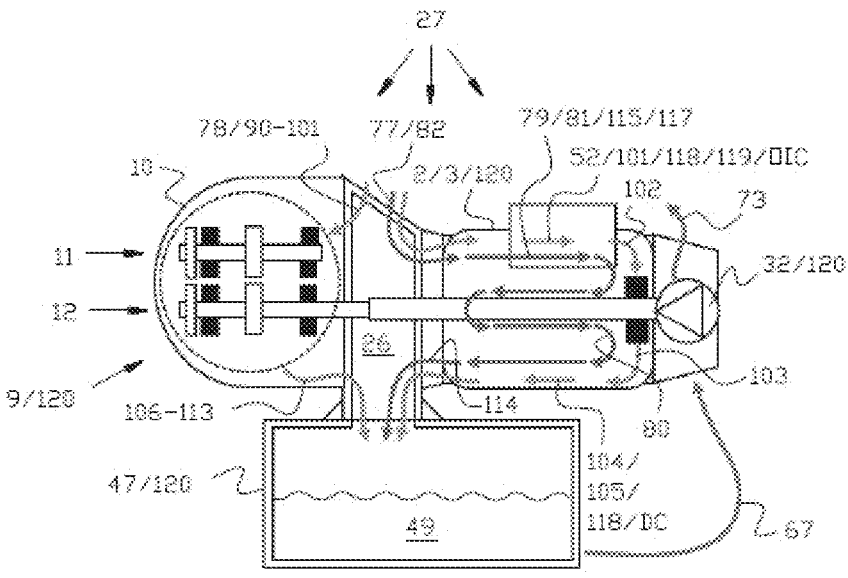
FIG. 18 is a schematic representation of a compressor assembly similar the compressor assembly represented in FIG. 16 wherein an additional oil injection line for injecting oil towards a motor bearing is integrated in the motor jacket, which configuration corresponds to the embodiment represented in FIG. 3.
Figure 19:
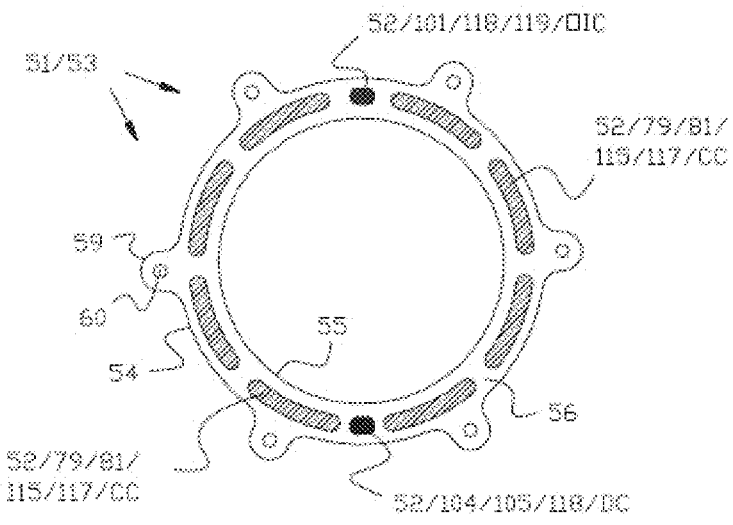
FIG. 19 represents a cross-section through the central motor housing body of the compressor assembly represented in FIG. 18.

FIGS. 18 and 19 illustrate still another embodiment of compressor assembly 1 according to the invention and the central motor housing body 51 of it, wherein in this example still a further form of integration has been applied. Indeed, in the illustrated example of FIGS. 18 and 19 the non-drive side filtered oil injection line 101 for guiding oil 49 towards the motor shaft bearing 7 is at least partly integrated in the motor jacket 51 by means of an axially extending motor jacket channel 119. Also, a radially extending oil injection channel 102 which extends through one of the covers 61 or 61 of the motor jacket 51 or through the motor jacket 51 itself is integrated in the motor housing 3.

In this case the motor jacket 51 clearly comprises a first group 117 of motor jacket channels 79 for cooling the motor 2 as well as a second group 118 of motor jacket channels 52 composed of a motor jacket channel 119 for injecting oil 49 towards the motor shaft bearing 7 and a motor jacket channel 104 for draining oil 49 from that motor shaft bearing 7 towards the oil reservoir 47.

The motor jacket channels 104 and 119 are not of the first group 117 of motor jacket channels 79 since they are not intended for cooling the motor 2 and they form each a pass-through channel or a part of such a pass-through channel for guiding oil 49 through the motor jacket 51.

Of course, additionally an oil injection line 100 for guiding oil 49 towards a drive side motor shaft bearing 45 could be integrated in the motor jacket 51 by means of a part of motor jacket channel 119 in combination with a radially extending oil injection channel 102 provided in the motor housing 3. Similarly, an oil drain line 105 can be integrated in the motor housing jacket 51 and/or compressor assembly housing 27 at the drive side 8 of the motor housing 3 for draining oil 49 from a drive side motor shaft bearing 45 by means of a radially extending channel 103 integrated in the motor housing 3 possibly in combination with a part of motor jacket channel 104, if such a bearing 45 is at least present.

In FIG. 19 the motor jacket channels 104 and 119 of the second group 118 for lubricating the motor shaft bearing 7 are positioned at opposite sides of the central motor housing body 51, but this is not necessarily the case. This configuration is for example useful when the first group 117 of motor jacket channels 117 are divided in two parts (left and right part in FIG. 19) which are interconnected for forming each a composed cooling channel 81. In other embodiments, the motor jacket channels 104 and 119 could for example be positioned near one another.

Figure 20:
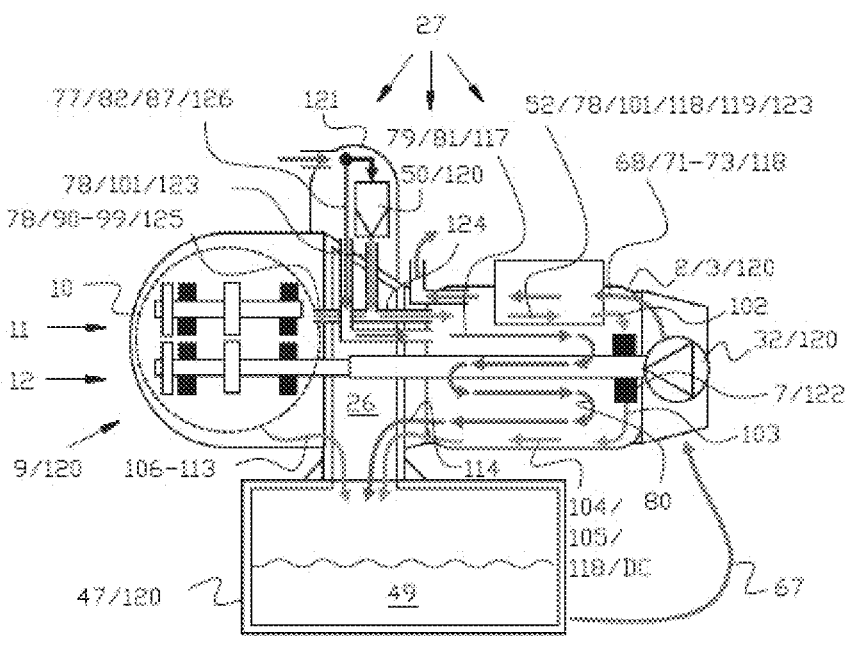
FIG. 20 is a schematic representation of a compressor assembly similar the compressor assembly represented in FIG. 18 wherein additionally an oil pump pressure line is partly integrated in the motor jacket and the compressor assembly housing, as well as an oil filter and oil lines connected to this oil filter.
Figure 21:
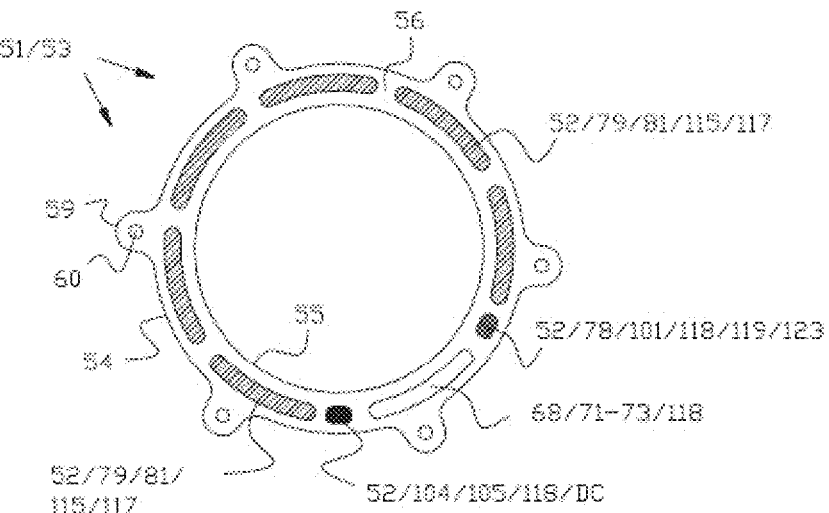
FIG. 21 represents a cross-section through the central motor housing body of the compressor assembly represented in FIG. 20.

FIGS. 20 and 21 illustrate another embodiment of a compressor assembly 1 and its central motor house body 51 wherein a still more elaborated form of integration was applied.

In the former examples the compressor assembly housing 27 comprises a motor housing 3, a compressor housing 10 and an intermediate housing compartment 26, respectively for housing in the compressor assembly housing 27 integrated compressor assembly components 120, which are in those examples respectively the motor 2, the compressor element 9 and interconnection means 25 or 34 for interconnecting the motor 2 and the compressor element 9.

In the embodiments of FIGS. 16, 18 and 20 and still other figures, the oil reservoir 48 is fixedly mounted underneath the above-mentioned parts of the compressor assembly housing 27 and it can therefore be considered as being an integral part of the compressor assembly housing 27 or an integrated compressor assembly component 120.

Furthermore, in all the discussed examples the oil-pump 32 also forms an integrated compressor assembly component 120, since it is mounted in the motor housing 3 or in a housing part which is mounted on that motor housing 3 and the oil-pump 32 is driven by the motor shaft 4.

In the example of FIG. 20, the compressor assembly housing 27 additionally comprises an oil-filter housing 121 which is mounted fixedly on the intermediate housing compartment 26. The oil-filter 50 is mounted in the oil-filter housing 121 and is forming still another integrated compressor assembly component 120.

In still other embodiments not represented in the figures also the oil-cooler 48 or still other components of the compressor assembly 1 could form an integrated compressor assembly component 120, which is housed in the compressor assembly housing 27 or a housing part mounted on it.

Another feature of the embodiment which is illustrated in FIGS. 20 and 21 is that additionally, compared to the example of FIG. 18, the oil-pump pressure line 73 is partly integrated in the motor jacket 51 by means of a motor jacket channel 71 of the second group 118, as was also the case in the examples of FIGS. 3 and 4.

So, the embodiment of FIGS. 20 and 21 has a very high degree of integration in that the oil injection line 101, the oil drain line 105 for injecting oil 49 to and draining oil 49 form the motor shaft bearing 7 are partly integrated in the motor jacket 51 as well as the oil-pump pressure line 73.

What's more, in the embodiment which is represented in FIGS. 20 and 21 a general preferred principle of the invention is also applied that an integrated compressor assembly component 120 or an integrated element 122 of such an integrated compressor assembly component 120 that needs to be lubricated or cooled, is preferably connected to another such an integrated compressor assembly component 120 or another such integrated element by means of an oil line which is entirely formed by a pass-through channel which is provided in the compressor assembly housing 27 for forming an entirely integrated oil line.

In the embodiment of FIG. 20, the oil line 101 for example interconnects the oil-filter 50, which is an integrated compressor assembly component 120, and the motor shaft bearing 7, which is an integrated element 122 of the motor 2 which itself is forming an integrated compressor assembly component 120. The integrated element 122 of the motor 2 needs to be lubricated by the oil 49 and the oil line 101 for supplying this oil 49 is entirely integrated in the compressor assembly housing 27.

Indeed, the concerned oil line 101 is entirely formed by a pass-through channel 123 which is provided in the compressor assembly housing 27 for forming an entirely integrated oil line 123. It is composed of a pass-through channel 124 provided in the compressor assembly housing 27, i.e., in the oil-filter housing 121, the intermediate housing compartment 26 and the motor housing, between the oil-filter 50 and the motor jacket 51 and of a motor jacket channel 119 of the second group 118, which is connected to another pass-through channel 102 provided in the motor housing 3.

Similarly, one or more of the oil injection lines 90 to 99 which each extend between the integrated oil-filter 50 and an integrated element 122 of the compressor assembly 1 (in particular of the compressor element 9 or of a gearwheel transmission 34) that needs to be lubricated, can be entirely integrated in the compressor assembly housing 27 by means of one or more pass-through channels 125 provided in the compressor assembly housing 27 for forming an entirely integrated oil line 125.

In the embodiment of FIG. 20, even the oil line 82 or oil line branch 87 between the oil-cooler 48 and the motor jacket channels 79 of the first group 117 in the motor jacket 51 is partly integrated in the compressor assembly housing 27 by means of a pass-through channel 126.

Of course, in a preferred embodiment of a compressor assembly 1 in line with the invention each interconnection oil line between an integrated compressor assembly component 120 and/or an integrated element 122 thereof is formed by an afore-mentioned entirely integrated oil line 123 or 126, so that a maximum of integration of oil lines in the compressor housing 27 is obtained.

FIG. 21 furthermore illustrates that the motor jacket channel 71 for the oil-pump pressure line 73 is located in between the motor jacket channels 104 and 119 for lubrication of the motor shaft bearing 7. In this case there three motor jacket channels 73, 104 and 109 of the second group 118.

Clearly, the cross-sectional size of the motor jacket channel 71 for the oil-pump pressure line 73 is much larger than the cross-sectional size of the motor jacket channels 104 and 119. This is obvious since the oil-pump pressure line 73 is providing the oil 49 for all the oil lines of the oil circulation system 33.

The cross-sectional size of the motor jacket channel 71 for the oil-pump pressure line 73 is more or less the same as the cross-sectional size of the motor jacket channels 79 of the first group 117 for cooling the motor 2, since the motor cooling requires the greatest portion of the oil flow through the oil circulation system 33.

Figure 22:
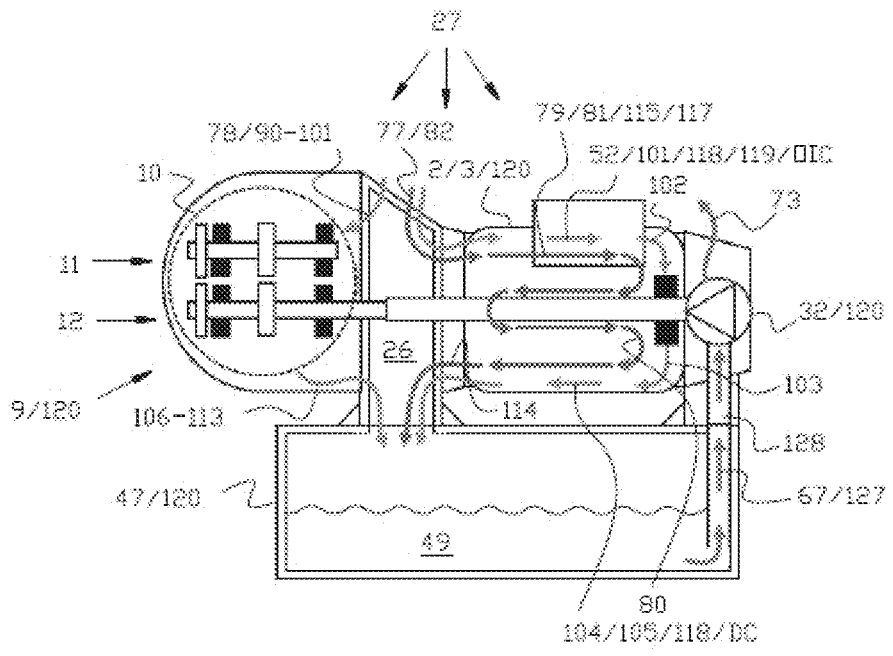
FIG. 22 is an illustration of an alternative for the compressor assembly represented in FIG. 18 wherein an oil suction line is integrated in the compressor assembly housing.
Figure 23:
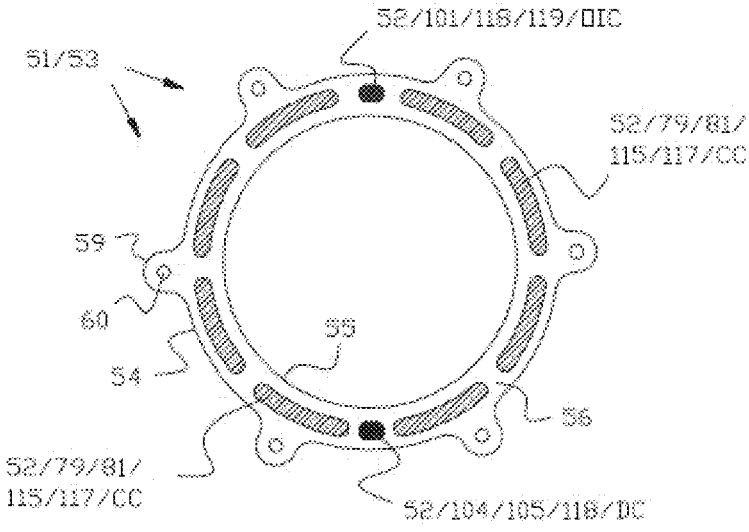
FIG. 23 represents a cross-section through the central motor housing body of the compressor assembly represented in FIG. 22.

The embodiment illustrated in FIGS. 22 and 23 is similar to the embodiment represented in FIGS. 18 and 19. The only difference is that in the embodiment of FIGS. 22 and 23 this time the oil-pump suction line 67 is embedded in the compressor assembly housing 27. Indeed, a pass-through channel 127 which is integrated in the compressor assembly housing 27 between the oil reservoir 47 and the oil-pump inlet 65 is forming the oil-pump suction line 67 and this oil-pump suction line 67 is therefore also an entirely integrated oil line 128.

Figure 24:
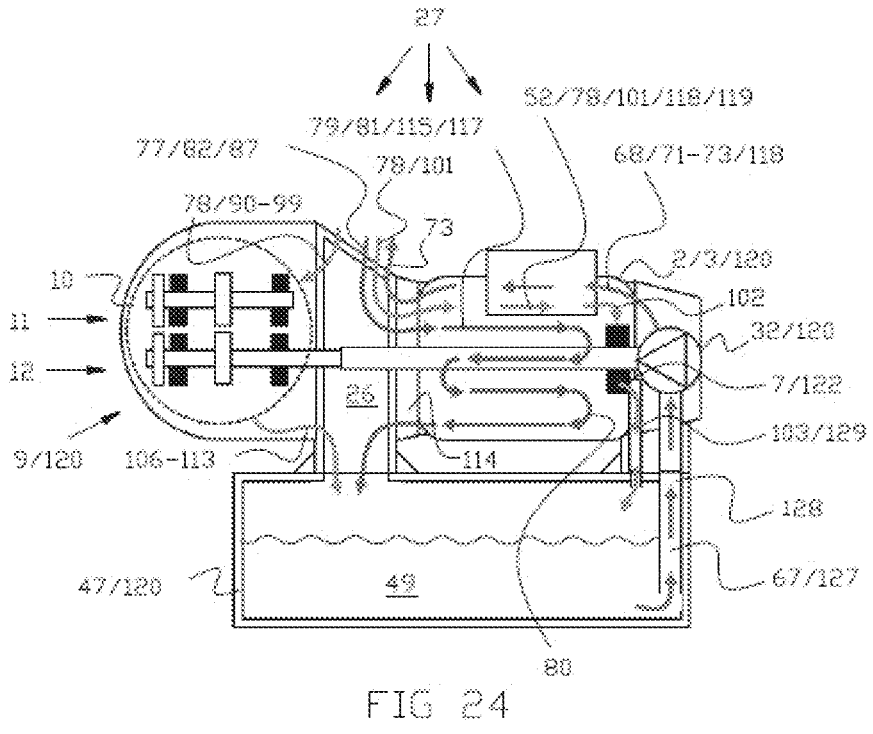
FIG. 24 illustrates a similar application of an oil suction line which is integrated in the compressor assembly housing of a compressor assembly which is similar to the compressor assembly as represented in FIG. 20.
Figure 25:
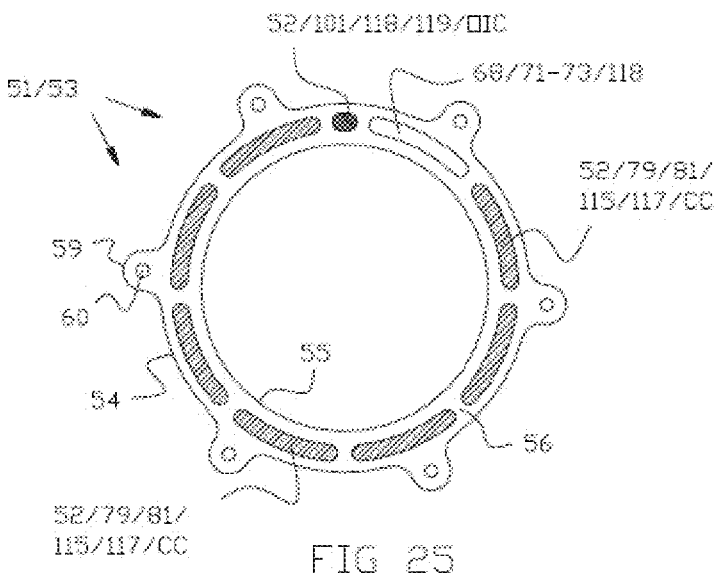
FIG. 25 represents a cross-section through the central motor housing body of the compressor assembly represented in FIG. 24.

In the embodiment of a compressor assembly 1 in accordance with the invention illustrated in FIGS. 24 and 25, the motor jacket channel 104 of the second group 118, present in the preceding examples, which is intended for draining oil 49 from the motor shaft bearing 7 towards the oil reservoir 47, has been abandoned.

Instead, the oil drain channel 103 has been extended and has been integrated in the compressor assembly housing 27 between the motor shaft bearing 7 and the oil reservoir 47, so to form a pass-through channel 129 which is forming an entirely integrated oil line 129 between an integrated element 122 of the motor 2 (represented by the motor shaft bearing 7) and an integrated component 120 (represented by the oil reservoir 47) of the compressor assembly 1.

The oil-pump pressure line 73 is again partly integrated in the compressor assembly housing 27 by means of a pass-through channel 68 which includes a motor-jacket channel 71 of the second group 118, as was also the case in the embodiment of FIG. 20 for example.

On the other hand, contrary to what was the case in the embodiment of FIG. 20, the oil lines 90-101 between the oil-filter 50 and the compressor assembly 1 are at least partly mounted externally to the compressor assembly housing 27. Connections to the oil-cooler 48 are also made by means of oil lines which are at least partly external to the compressor housing 27.

The embodiment represented in FIG. 24 has therefore a somewhat elaborated form of integration for as far as the parts of the oil circulation system 33 are concerned which are related to the oil-pump 32, but it has a somewhat less elaborated form of integration for as far as connections to the oil-filter 50 and the oil-cooler 48 are concerned.

FIG. 25 illustrates that in the concerned embodiment of a compressor assembly 1 in accordance with the invention the motor jacket 51 comprises only two motor jacket channels 71 and 101 of the second group 118, respectively for injecting oil 49 towards the motor shaft bearing 7 and for partly integrating the oil-pump pressure line 73 in the motor housing 3.

Figure 26:
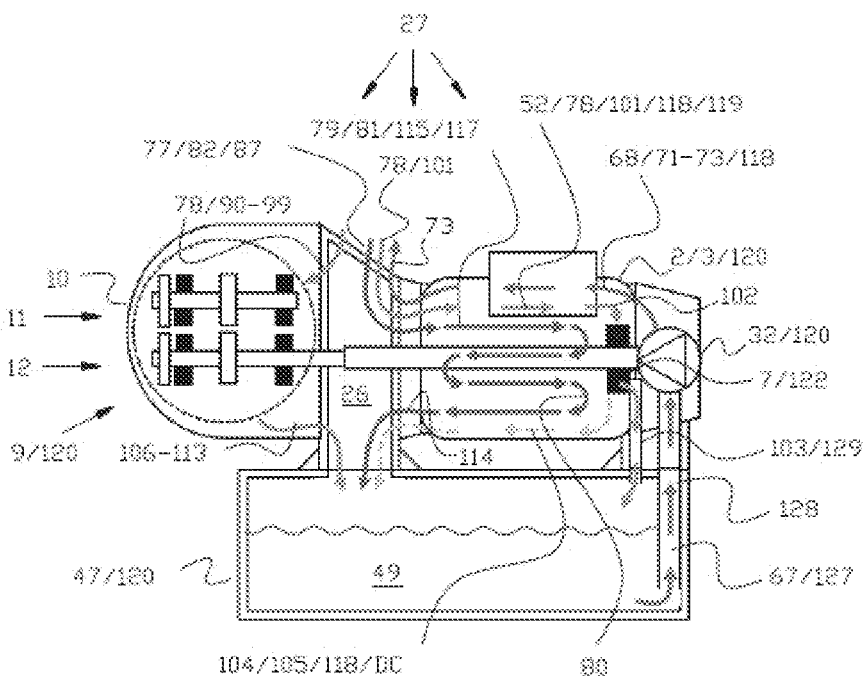
FIG. 26 illustrates schematically a compressor assembly similar to the compressor assembly represented in FIG. 24, wherein this time an oil drain line from a motor bearing is integrated in the compressor assembly housing or oil sump, while an additional oil drain line is still provided in the motor jacket for draining leaked oil towards the oil reservoir.
Figure 27:
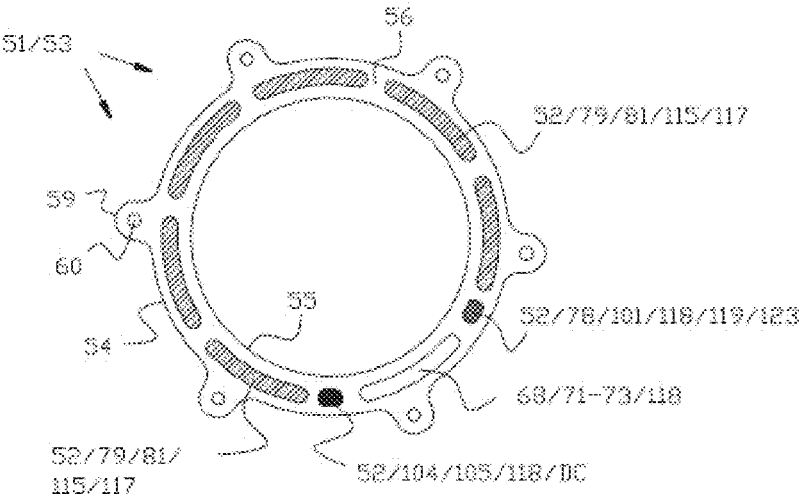
FIG. 27 represents a cross-section through the central motor housing body of the compressor assembly represented in FIG. 26.

The embodiment of a compressor assembly 1 illustrated in FIG. 26 is a kind of combination of the embodiments represented in FIGS. 20 and 22. Indeed, an entirely integrated oil line 128 between the oil shaft bearing 7 and the oil reservoir 47 is formed by a pass-through channel 127 provided in the compressor assembly housing 27 and constitutes the oil-pump suction line 67.

However, the motor jacket channel 104 of the second group 118 which was abandoned in the embodiment of FIG. 24, has been kept in the embodiment of FIG. 26. This motor jacket channel 104 forms also still a part of an oil drain line 105 between the motor 2 and the oil reservoir 47 and is intended for draining leaked oil 49 from the motor 2 towards the oil reservoir 47.

The oil-pump pressure line 73 is again partly formed by a motor jacket channel 71 of the second group 118 and in total the motor jacket 51 comprises again three motor jacket channels 71, 104 and 101 of the second group 118 which are not intended for cooling of the motor 2.

Figure 28:
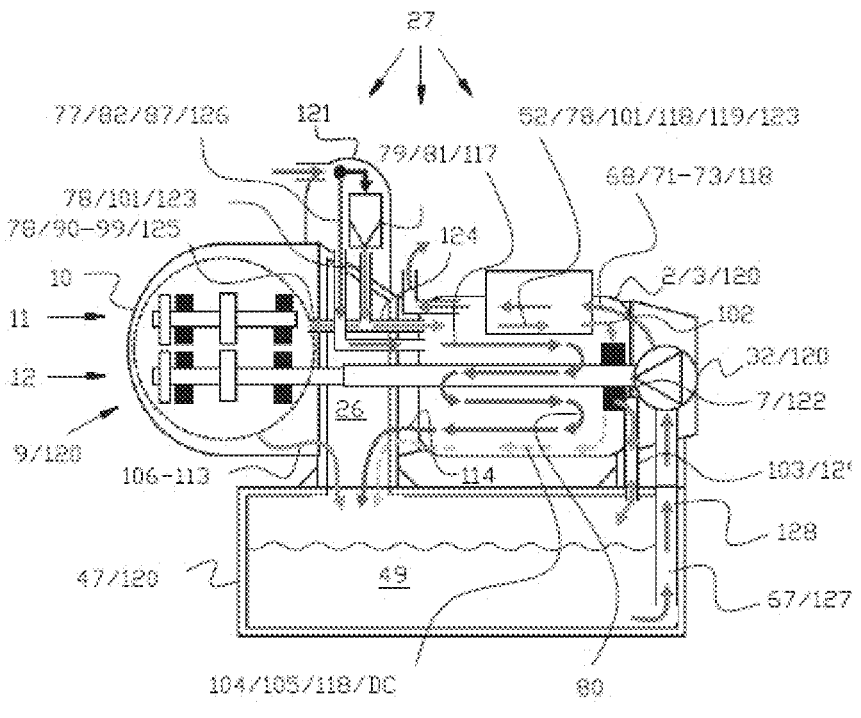
FIG. 28 illustrates schematically a compressor assembly similar to the compressor assembly represented in FIG. 26, wherein the oil filter and oil lines connected to this oil filter are also integrated in the compressor assembly housing.
Figure 29:
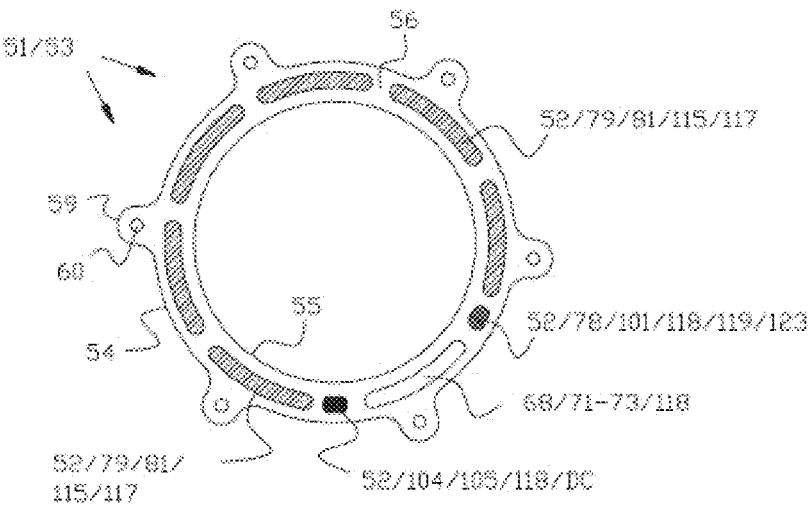
FIG. 29 represents a cross-section through the central motor housing body of the compressor assembly represented in FIG. 28.

The example illustrated in FIGS. 28 and 29 introduces a still higher form of integration of components 120 and oil lines of the compressor assembly 1 in the same compressor assembly housing 27, compared to the former embodiment of FIG. 26.

This time the oil filter 50 and the concerned oil lines 90 to 101 or one or more of these oil lines 90-101 which are connected to this oil filter 50 are again integrated in the compressor assembly housing 27, as was also the case in the embodiment of FIG. 20.

Figure 30:
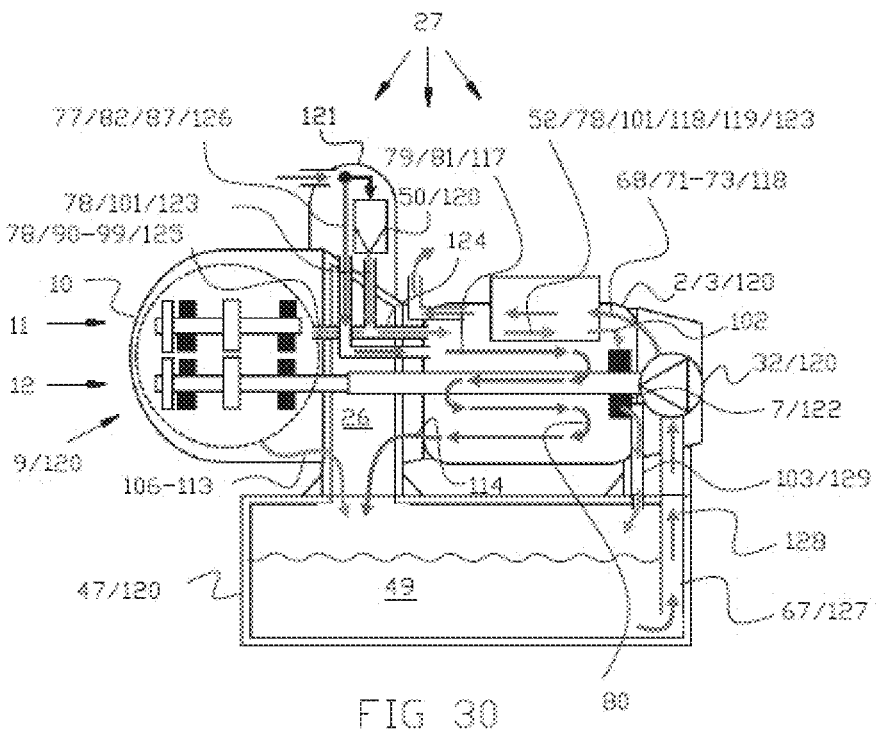
FIG. 30 illustrates schematically a compressor assembly similar to the compressor assembly represented in FIG. 28, wherein this time no additional oil drain line is provided in the motor jacket for draining leakage oil towards the oil reservoir or oil sump; and, FIG. 31 represents a cross-section through the central motor housing body of the compressor assembly represented in FIG. 30.
Figure 31:
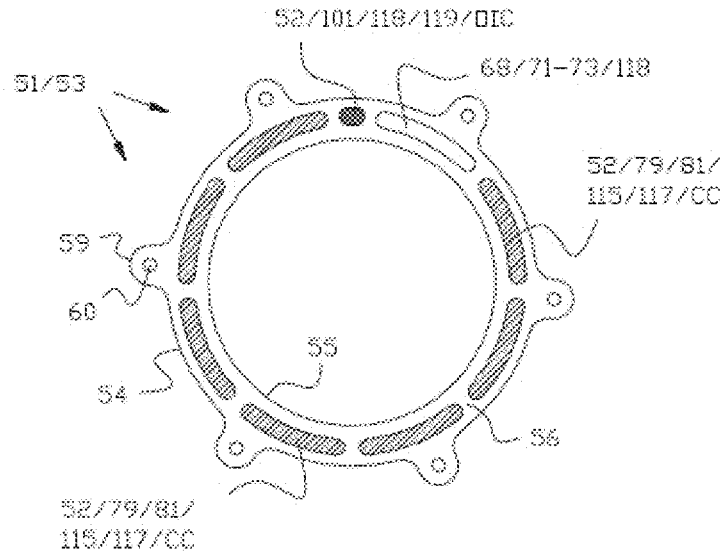

Finally, the embodiment represented in FIGS. 30 and 31 is a simplified version of the former embodiment of FIGS. 28 and 29, since the only difference is that the motor jacket channel 104 for draining leaked oil from the motor 2 to the oil reservoir 47 is abandoned. The remaining parts are identic and as a result the motor jacket 51 has apart from the motor jacket channels 79 of the first group 117 for the motor cooling, only two motor jacket channels 71 and 101 of the first group, respectively for forming part of the oil-pump pressure line 73 and for forming an oil injection line 101 towards the motor shaft bearing 7.

It is clear that many other configurations can be applied, with more or less integration of oil lines and other components of the compressor assembly 1 in the same compressor assembly housing 27.

The present invention is in no way limited to the embodiments of a compressor assembly 1 as described before, but such a compressor assembly 1 can be applied and be implemented in many different ways without departure from the scope of the invention.

The invention claimed is:

1. A compressor assembly, comprising a compressor assembly housing, a motor which drives one or more compressor rotors of a compressor element, comprising an oil circulation system for cooling and lubricating components of the compressor assembly, wherein the oil circulation system comprises an oil reservoir, an oil cooler and an oil filter, respectively for cooling and for filtering oil flowing through one or more oil lines of the oil circulation system which interconnect components of the compressor assembly, wherein the motor has a motor housing comprising a central motor housing body executed as a motor jacket in which motor jacket channels are provided for circulating oil through the motor jacket, wherein the motor jacket comprises at least a first group of motor jacket channels composed of one or more such channels which is intended for cooling the motor and that the compressor assembly housing comprises one or more pass-through channels for guiding oil through the compressor assembly housing, wherein such a pass-through channel forms at least a part of an afore-mentioned oil line which interconnects components of the compressor assembly, wherein the compressor assembly comprises one or more oil cooling line sections which extend(s) from the oil cooler to the oil reservoir and in that the first group of motor jacket channels are each included in one of the one or more oil cooling line sections for cooling the motor.

2. The compressor assembly according to claim 1, wherein the compressor assembly housing houses integrated compressor assembly components, which comprise at least the motor, the compressor element and interconnection means for interconnecting the motor and the compressor element and possibly one or more other integrated compressor assembly components, including at least one of the oil reservoir, the oil filter, the oil cooler, and an oil pump, and wherein an integrated compressor assembly component or an integrated element of such an integrated compressor assembly component that needs to be lubricated or cooled, is connected to another such an integrated compressor assembly component or another such integrated element by means of an aforementioned oil line which is entirely formed by a pass-through channel which is provided in the compressor assembly housing for forming an entirely integrated oil line.

3. The compressor assembly according to claim 2, wherein each interconnection oil line between an integrated compressor assembly component and/or an integrated element thereof is formed by an afore-mentioned entirely integrated oil line.

4. The compressor assembly according to claim 1, wherein the oil circulation system of the compressor assembly comprises at least a first circulation loop and a second circulation loop wherein oil is circulating between the oil reservoir and the oil cooler and back, wherein the first circulation loop is an unfiltered circulation loop wherein no oil filter is included and the second circulation loop is a filtered circulation loop in which the oil filter is provided for filtering the oil and wherein the motor jacket channels of the first group are included in the first unfiltered circulation loop, which channels are forming cooling channels for cooling of the motor housing jacket.

5. The compressor assembly according to claim 4, wherein an oil pump is integrated in the motor housing or is mounted on a motor housing cover or on another part of the compressor assembly housing provided at a non-drive side or at a drive side of the central motor housing body and is driven by a motor shaft of the motor.

6. The compressor assembly according to claim 1, wherein the motor jacket comprises a second group of motor jacket channels composed of one or more such channels which are not motor jacket channels of the first group and which form each an afore-mentioned pass-through channel or a part of such a pass-through channel for guiding oil through the motor jacket.

7. The compressor assembly according to claim 6, wherein one or more of the following oil lines of the compressor assembly are at least partly integrated in the motor jacket by being partly formed by one or more motor jacket channels of the second group:

an oil line for supplying oil from the oil reservoir to the oil filter and/or to the oil cooler;

an oil line which is connected to an outlet of the oil filter for supplying filtered oil to a component of the compressor assembly;

an oil line which is connected to an outlet of the oil cooler for supplying cooled oil to a component of the compressor assembly;

an oil injection line for supplying oil to a component of the compressor assembly for lubrication purposes; and/or, an oil drain line for draining oil coming from a component of the compressor assembly towards the oil reservoir.

8. The compressor assembly according to claim 6, wherein the oil circulation system comprises an oil pump for providing driving force for circulating oil through oil lines of the oil circulation system from the oil reservoir to the concerned components to be cooled and/or lubricated and back to the oil reservoir and that one or more of the following oil lines of the compressor assembly are at least partly integrated in the motor jacket by being partly formed by one or more motor jacket channels of the motor jacket of the second group or are at least partly integrated in the compressor assembly housing:

an oil pump suction line for connecting the oil reservoir with an inlet of the oil pump of the compressor assembly;

an oil pump pressure line for connecting an outlet of the oil pump with the oil cooler and/or the oil filter.

9. The compressor assembly according to claim 6, wherein an oil pump is at its outlet directly connected to an afore-mentioned motor jacket channel of the second group provided in the central motor housing body.

10. The compressor assembly according to claim 1, wherein the motor housing is provided with a pass-through channel, which passes through the central motor housing body and through motor housing covers provided at opposite ends of the central motor housing body and wherein an outlet of an oil pump is directly connected to this pass-through channel and is forming at least partly an oil pump pressure line of the oil pump.

11. The compressor assembly according to claim 1, wherein the motor housing comprises additionally at a drive side of the central motor housing body a drive side motor housing cover adjacent to the compressor rotors driven by the motor and comprises at a non-drive side of the central motor housing body a non-drive side motor housing cover at an opposite side of the central motor housing body, wherein the motor housing covers comprise one or more interconnection channels which collaborate in an assembled status with motor jacket cooling channels of the first group for interconnecting concerned cooling channels for forming a single or multiple composed cooling channel(s) for cooling of the motor housing jacket.

12. The compressor assembly according to claim 11, wherein the motor housing covers comprise one or more pass-through openings which collaborate in the assembled status with a motor jacket channel for forming a pass-through channel through the motor housing.

13. The compressor assembly according to claim 1, wherein the channels in the motor jacket are extending in axial directions parallel to the axial direction of a motor shaft of the motor.

14. The compressor assembly according to claim 1, wherein the compressor assembly housing has a compressor assembly housing core, which is composed of a motor housing which is interconnected with a compressor housing possibly by means of an intermediate housing for coupling a motor shaft to a compressor rotor shaft, directly or indirectly by means of a gear transmission, and wherein the compressor assembly housing additionally comprises one or more additional compressor assembly housing part(s) which are directly mounted on the compressor assembly housing core and which include one or more of the following:

an oil pump housing for housing an oil pump which is driven by the motor;

an oil filter housing for housing the oil filter;

an oil sump or oil reservoir housing; and/or, an oil cooler housing for housing the oil cooler.

15. The compressor assembly according to claim 1, wherein the oil circulation system of the compressor assembly comprises one or more oil injection lines for providing cooled, filtered lubrication oil to components of the compressor assembly and wherein the oil filter is provided in an oil line of cooled oil which is connected to an outlet of the oil cooler and wherein one or more of the oil injection lines are at least partly integrated in the compressor assembly housing.

16. The compressor assembly according to claim 1, wherein for the motor jacket cooling at least one oil line of cooled oil is provided between the outlet of the oil cooler and at least one cooling channel in the central motor housing body jacket or one or more composed cooling channel(s) which is composed of several cooling channels in the central motor housing body jacket which are interconnected by means of interconnection channels in motor housing covers of the central motor housing body, wherein the at least one oil line of cooled oil is connected to the outlet of the oil cooler, which is branched upstream of the oil filter into a first branch towards the oil filter and a second branch towards said cooling channel or one or more composed cooling channel(s) in the motor housing jacket and wherein the second branch is at least partly integrated in the compressor assembly housing.

17. The compressor assembly according to claim 1, wherein the oil circulation system of the compressor assembly comprises one or more oil injection lines for providing uncooled filtered lubrication oil to components of the compressor assembly and wherein the oil filter is provided in an oil line of uncooled oil which is branched-off from an oil pump pressure line provided between the oil pump and the oil cooler and wherein one or more of the oil injection lines are at least partly integrated in the compressor assembly housing.

18. The compressor assembly according to claim 1, wherein for each bearing supporting a motor shaft, an oil injection channel is provided for supplying filtered oil to a concerned motor shaft bearing as well as an oil drain channel for draining lubrication oil from the concerned motor shaft bearing and wherein one or more of these oil injection channels and/or oil drain channels are at least partly integrated in the compressor assembly housing.

* * * * *